US011546735B2

(12) United States Patent
Passler et al.

(10) Patent No.: US 11,546,735 B2
(45) Date of Patent: Jan. 3, 2023

(54) PEAK TO SIGMA RATIO MEASUREMENT WITH ACTIVE GEO-LOCATION FOR WIRELESS LOCAL AREA NETWORK DEVICES

(71) Applicant: SR Technologies, Inc., Sunrise, FL (US)

(72) Inventors: Mark Passler, Boca Raton, FL (US); Graham K. Smith, Boca Raton, FL (US); Ryan Busser, Fort Lauderdale, FL (US); Olivia Fernandez, Boca Raton, FL (US); Steven Romanow, Sunrise, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/380,662

(22) Filed: Jul. 20, 2021

(65) Prior Publication Data
US 2022/0070622 A1 Mar. 3, 2022

Related U.S. Application Data

(60) Provisional application No. 63/069,946, filed on Aug. 25, 2020.

(51) Int. Cl.
| | |
|---|---|
| *G01S 5/14* | (2006.01) |
| *H04W 4/029* | (2018.01) |
| *H04W 72/04* | (2009.01) |
| *G01S 5/02* | (2010.01) |
| *H04B 7/185* | (2006.01) |

(52) U.S. Cl.
CPC .......... *H04W 4/029* (2018.02); *G01S 5/0221* (2013.01); *G01S 5/14* (2013.01); *H04B 7/18502* (2013.01); *H04W 72/0466* (2013.01)

(58) Field of Classification Search
CPC .............. G01S 5/14; G01S 5/04; G01C 21/28
See application file for complete search history.

(56) References Cited

U.S. PATENT DOCUMENTS

| | | | | |
|---|---|---|---|---|
| 2005/0170843 A1* | 8/2005 | Billhartz | ............... | H04W 64/00 455/422.1 |
| 2007/0279237 A1* | 12/2007 | Julian | ..................... | H04L 67/52 340/686.1 |

(Continued)

*Primary Examiner* — Qutbuddin Ghulamali
(74) *Attorney, Agent, or Firm* — Christopher & Weisberg, P.A.

(57) ABSTRACT

A method and wireless devices (WDs) for geo-location of wireless devices are disclosed. According to one aspect, a method in a first WD includes: transmitting a sequence of ranging signals and receiving a plurality of ranging response signals from a second WD, the ranging response signals being responsive to the ranging signals. For each of the plurality of ranging response signals, a received sequence of bits is determined. A correlation between the received sequence of bits and an expected sequence of bits is determined. The method also includes determining a subset of the plurality of received sequences of bits deemed not to arise from noise, and determining the subset being based at least in part on the correlations. The method also includes determining a distance between the first WD and the second WD based at least in part on a plurality of received sequences in the subset.

20 Claims, 18 Drawing Sheets

(56) References Cited

U.S. PATENT DOCUMENTS

| | | | |
|---|---|---|---|
| 2008/0150786 A1* | 6/2008 | Breed | B60W 30/16 |
| | | | 342/53 |
| 2012/0280865 A1* | 11/2012 | Gardner | G01S 5/021 |
| | | | 342/463 |
| 2013/0070607 A1* | 3/2013 | Sun | G01S 5/0205 |
| | | | 370/241 |
| 2016/0337792 A1* | 11/2016 | Bhavsar | H04W 48/18 |
| 2020/0296614 A1* | 9/2020 | Lee | H04W 28/021 |

* cited by examiner

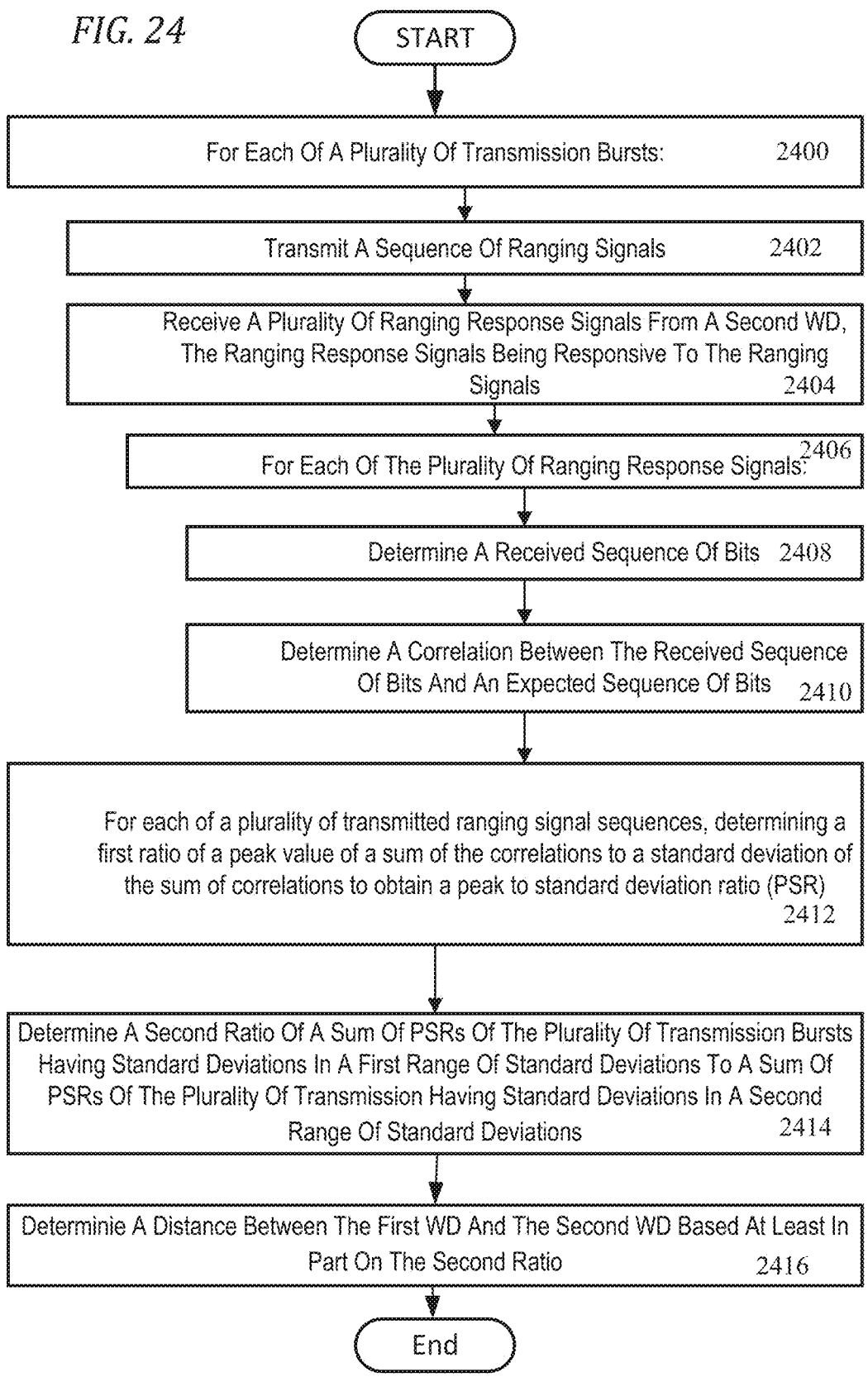

PEAK TO SIGMA RATIO MEASUREMENT WITH ACTIVE GEO-LOCATION FOR WIRELESS LOCAL AREA NETWORK DEVICES

CROSS-REFERENCE TO RELATED APPLICATION

This application is related to and claims priority to U.S. Provisional Patent Application Ser. No. 63/069,946, filed Aug. 25, 2020, entitled PEAK TO SIGMA RATIO MEASUREMENT WITH ACTIVE GEO-LOCATION FOR WIRELESS LOCAL AREA NETWORK DEVICES, the entirety of which is incorporated herein by reference.

TECHNICAL FIELD

The present disclosure relates to geo-location of wireless devices, and in particular to a method, device, and system for the geo-location of wireless local area network (WLAN) devices.

BACKGROUND

Initially, it is noted that IEEE Standard 802.11—2016 is used as the base reference for disclosures used herein, the entire contents of which are incorporated herein by reference. The IEEE 802.11-2016 Standard is commonly referred to as "Wi-Fi" and is referred to as such herein as the "Standard".

The location of wireless devices can be determined by various methods. These methods may be classified as active, passive, and combined active and passive. In an active location scheme, a device that is determining the location or range, the measuring device, transmits certain packets to the device being located, the target device, and a common method is to measure the time of arrival (TOA) of the response packet from the target device and compare that to the time of departure (TOD) of the request packet that was transmitted by the measuring device so as to determine the round trip time (RTT).

In such location systems, it is common to use multiple measuring devices to determine the location. In such systems, simultaneous TOA and/or TOD measurements are taken by different measuring devices situated at different points, and the location of the target device is calculated from these simultaneous measurements.

In an active location system, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will typically be an acknowledgement (ACK) packet. If the packet transmitted from the measuring station to the target station is a control packet, for example, a request-to-send (RTS) packet, then the response from the target station will typically be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The time of flight, TOF1, determined from the calculation TOF= (TOA−TOD−SIFS)/2, is measured for transmissions from measuring station 110a and this can be used to calculate the distance D1 130 using the formula D1=TOF1*c where c is the speed of light. Similarly, TOF2 and TOF3 measurements result in the determination of distances D2 140 and D3 150. The methods for calculating the location of target station 120 using the distances D1 130, D2 140 and D3 150 are well known.

FIG. 2 is a diagram of a location system where a single airborne measuring station 110 is used. The airborne measuring station 110 is depicted being flown in a circular orbit 200, center E 220, around a target station 120 at location F 230. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. Unless the target station 120 is positioned at the center E 220 of the orbit 200, the distances D4 210, D5 211, and D6 212 will not be equal and thus, in the general sense, as the airborne measuring station 110 moves around the orbit 200 the RTT measurements will vary in relation to the relative positions of the airborne measuring station 110 and the target station 120.

RTT measurements, in the general sense, will exhibit variations due to noise, in the case of weak signal strengths, and, in part, the timing accuracy of the clock at the target station 120 and the timing accuracy of the clock at the airborne measuring station 110.

The signal level, Pr, received at the airborne measuring station 110 is:

$$Pr = Pt + G_1 + G_2 - L_{fs} - Lo \qquad (1)$$

Where Pt=Transmit power from the target station 120
$G_1$=Antenna gain at the airborne measuring station
$G_2$=Antenna gain at the target station
$L_{fs}$=Propagation loss, free space
Lo=Obstruction loss With respect of an airborne measuring station 110, the obstruction losses, Lo, for target stations may vary from 0 dB, for line of sight or outdoor target stations, up to 15-20 dB for target stations that are indoors. The range of the airborne measuring station 110 to successfully detect the response packets from each of these target stations is dependent upon the receive sensitivity of the airborne measuring station 110. An airborne measuring station, compliant with the Standard, would need to receive a packet without errors and the receive sensitivity is restricted by the noise figure of the airborne measuring station 110.

FIG. 3 is similar to FIG. 2 and is an example diagram of an airborne measuring station 110 depicted being flown in the circular orbit 200, starting at point A 201, around a target station 120 at location F 230. The airborne measuring station 110 is transmitting request packets and at those points of the orbit where a response packet is received, and an RTT measured, an RTT dot 300 is placed on the orbit. In this example, the density or color of the RTT dot 300 may vary according to the signal level of the received RTT, and hence examples are shown of weak, medium and strong signal strengths, 301, 302 and 303 respectively. In the example depicted in FIG. 3, the strong received signals 303 are shown when the airborne measuring station 110 is close to the target station 120. Also, in this example, there are no received response packets for sections of the orbit that are at longer distances from the target station 120. Such a display of the receptions is often referred to as a "heatworm" and may be used by the operator(s) of the airborne measuring station 110 as to provide a clear indication that response packets are being received from the target station 120, and also to provide information that may help the operator adjust the orbit so as to improve the location measurement, i.e., receive more response packets.

Improving the sensitivity of the airborne measuring station 110 may involve use of a technique known as correlation, where the individual bits of the received response packet are compared to the individual bits of the expected response packet and, based upon a correlation threshold, a decision may be taken as to whether the wanted response packet, CTS or ACK, has been received. As the correlation threshold is lowered, in order to make the sensitivity higher, there is an increased likelihood that pure noise can exceed the threshold and produce a false RTT result. False RTT readings may be quite acceptable for the calculation of the true geolocation of the target station 120, as long as a sufficient number of wanted RTTs are also present but there may be a significant time lag before the false RTTs can be filtered out. In order to be of maximum use, the heatworm should be updated in real time. If false RTTs due to noise are displayed on the heatworm, even if displayed as weak signal strength 301, then the operator of the airborne measuring station 110 may not know that these are not true RTTs, and consequently would not know if the airborne measuring station 110 was transmitting on the right channel or in the right area.

SUMMARY

Methods and wireless devices for the geo-location of wireless local area network (WLAN) devices are provided.

According to one aspect, a method in a first wireless device (WD) includes: for each of a plurality of transmission bursts: transmitting a sequence of ranging signals and receiving a plurality of ranging response signals from a second WD, the ranging response signals being responsive to the ranging signals. For each of the plurality of ranging response signals, the method includes determining a received sequence of bits, determining a correlation between the received sequence of bits and an expected sequence of bits. The method also includes: for each of a plurality of transmitted ranging signal sequences, determining a first ratio of a peak value of a sum of the correlations to a standard deviation of the sum of the correlations to obtain a peak to standard deviation ratio (PSR): determining a second ratio of a sum of PSRs having standard deviations in a first range of standard deviations to a sum of PSRs having standard deviations in a second range of standard deviations; and determining a distance between the first WD and the second WD based at least in part on the second ratio.

According to this aspect, in some embodiments, the first range of standard deviations is 4σ to 4.5σ and the second range of standard deviations is 3.5σ to 4σ, σ being one standard deviation. In some embodiments, the method further includes: comparing the second ratio to a threshold; and when the second ratio is above the threshold and a PSR is within a specified range, then using a time of occurrence of the peak value to determine the distance between the first WD and the second WD. In some embodiments, the method also includes: comparing the second ratio to a threshold; and when the second ratio is less than a threshold and a PSR is within a specified range, then not using a time of occurrence of the peak value to determine the distance between the first WD and the second WD. In some embodiments, the method also includes, when a PSR is less than a threshold, then not using a time of occurrence of the peak value to determine the distance between the first WD and the second WD. In some embodiments, the method further includes, based at least in part on the second ratio, performing one of: indicating that a signal has been received; using a time of occurrence of the peak value to determine the distance between the first WD and the second WD; and discarding the time of occurrence of the peak value. In some embodiments, a time of occurrence of a peak value is used to determine the distance between the first WD and the second WD when a PSR is between 4.5 and 5 and the second ratio is greater than a threshold. In some embodiments, a time of occurrence of a peak value is not used to determine the distance between the first WD and the second WD when a PSR is between 3.5 and 4 and the second ratio is less than a threshold.

According to another aspect, a first wireless device (WD) includes: a radio interface configured to, for each of a plurality of transmission bursts: transmit a sequence of ranging signals, and receive a plurality of ranging response signals from a second WD, each ranging response signal being responsive to a corresponding ranging signal. The WD also includes processing circuitry configured to: for each of the plurality of transmission bursts and for each of the plurality of ranging response signals: determine a received sequence of bits; and determine a correlation between the received sequence of bits and an expected sequence of bits. The processing circuitry is also configured to, for each of a plurality of transmitted ranging signal sequences, determine a first ratio of a peak value of a sum of the correlations to a standard deviation of the sum of the correlations to obtain a peak to standard deviation ratio (PSR). The processing circuitry is also configured to determine a second ratio of a sum of PSRs having standard deviations in a first range of standard deviations to a sum of PSRs having standard deviations in a second range of standard deviations; and determine a distance between the first WD and the second WD based at least in part on the second ratio.

According to this aspect, in some embodiments, the first range of standard deviations is 4σ to 4.5σ and the second range of standard deviations is 3.5σ to 4σ, σ being one standard deviation. In some embodiments, the processing circuitry is further configured to: compare the second ratio to a threshold; and when the second ratio is above the threshold and a PSR is within a specified range, then use a time of occurrence of the peak value to determine the distance between the first WD and the second WD. In some embodiments, the processing circuitry is further configured to: compare the second ratio to a threshold; and when the second ratio is less than a threshold and a PSR is within a specified range, then not use a time of occurrence of the peak value to determine the distance between the first WD and the second WD. In some embodiments, the processing circuitry is further configured to, when a PSR is less than a threshold, then use a time of occurrence of the peak value to determine the distance between the first WD and the second WD. In some embodiments, the processing circuitry is further configured to, based at least in part on the second ratio, perform one of: indicate that a signal has been received; use a time of occurrence of the peak value to determine the distance between the first WD and the second WD; and discard the time of occurrence of the peak value. In some embodiments, a time of occurrence of a peak value is used to determine the distance between the first WD and the second WD when a PSR is between 4.5 and 5 and the second ratio is greater than a threshold. In some embodiments, a time of occurrence of a peak value is not used to determine the distance between the first WD and the second WD when a PSR is between 3.5 and 4 and the second ratio is less than a threshold.

According to yet another aspect, a first wireless device (WD), includes a radio interface configured to, for each of a plurality of transmission bursts: transmit a plurality of ranging signals and record a time of transmission of each ranging signal of the plurality of ranging signals; and receive a plurality of ranging response signals, each ranging response signal corresponding to a respective ranging signal. The WD also includes processing circuitry in communication with the radio interface, the processing circuitry configured to, for each of the plurality of transmission bursts: extract a sequence of bits from each ranging response signal of the plurality of ranging signals of a transmission burst to obtain a plurality of received bit sequences; correlate each received bit sequence of the plurality of received bit sequences with an expected sequence to produce a plurality of correlations. The processing circuitry is furthered configured to, for each of a plurality of transmitted ranging signal sequences, determine a first ratio of a peak value of a sum of the correlations to a standard deviation of the sum of the correlations to obtain a peak to standard deviation ratio (PSR); determine a second ratio of a sum of PSRs having standard deviations in a first range of standard deviations to a sum of PSRs having standard deviations in a second range of standard deviations; and determine a distance between the first WD and the second WD based at least in part on the second ratio.

According to this aspect, in some embodiments, the first range of standard deviations is 4σ to 4.5σ and the second range of standard deviations is 3.5σ to 4σ, σ being one standard deviation. In some embodiments, the processing circuitry is further configured to: compare the second ratio to a threshold; and when the second ratio is above the threshold and a PSR is within a specified range, then use a time of occurrence of the peak value to determine the distance between the first WD and the second WD. In some embodiments, the processing circuitry is further configured to: compare the second ratio to a threshold; and when the second ratio is less than a threshold and a PSR is within a specified range, then not use a time of occurrence of the peak value to determine the distance between the first WD and the second WD. In some embodiments, the processing circuitry is further configured to, when a PSR is less than a threshold, then use a time of occurrence of the peak value to determine the distance between the first WD and the second WD. In some embodiments, the processing circuitry is further configured to, based at least in part on the second ratio, perform one of: indicate that a signal has been received; use a time of occurrence of the peak value to determine the distance between the first WD and the second WD; and discard the time of occurrence of the peak value. In some embodiments, a time of occurrence of a peak value is used to determine the distance between the first WD and the second WD when a PSR is between 4.5 and 5 and the second ratio is greater than a threshold. In some embodiments, a time of occurrence of a peak value is not used to determine the distance between the first WD and the second WD when a PSR is between 3.5 and 4 and the second ratio is less than a threshold.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 24 is a flowchart of an example process for determining range between wireless devices.

DETAILED DESCRIPTION

This Application incorporates U.S. patent application Ser. No. 16/782,762 by reference in its entirety. As an initial matter, it is noted that improving the effective sensitivity of the measuring receiver as compared with known arrangements will increase the range at which target stations 120 may be detected and located as compared to known methods. With this increase in sensitivity, however, the probability that false RTTs due to noise increases and indications to the operator of an airborne measuring station 110 that wanted RTTs are being received, may be false. In addition, if RTTs due to noise can be identified and filtered out, such that the RTTs that are forwarded to be used in the geo-location calculations contain mostly wanted RTTs, then the accuracy of the geo-location may be improved.

In one embodiment of the present disclosure, a single airborne measuring station 110 is used. The present disclosure provides methods and devices that detect the likelihood of RTTs from a wanted target station 120 as against RTTs due to noise such that an indication may be placed on a display of the orbit of an airborne measuring station 110 and only RTTs that are likely to correspond to the wanted target station 120 are inputted to the geo-location calculations. In some embodiments, the disclosed method applies to the reception of direct sequence spread spectrum (DSSS) acknowledgement (ACK) and clear-to-send (CTS) packets in response to data null and request-to-send (RTS) packets respectively, in the 2.4 GHz band.

Figure 4:
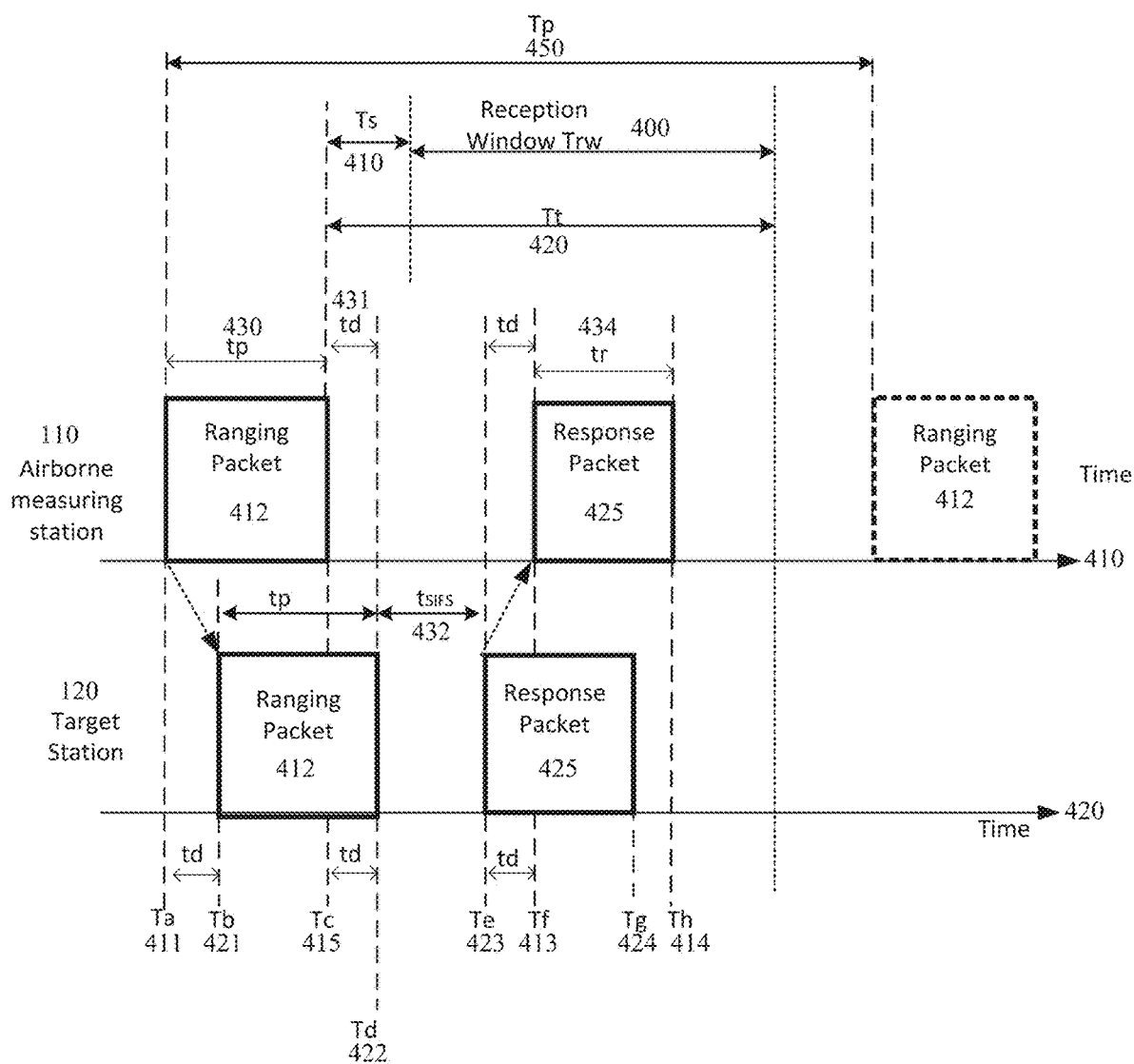
FIG. 4 is a timing diagram that describes the ranging method of the present disclosure that may be used to determine the distance between two wireless devices.

Referring again to the drawing figures in which like reference designators refer to like elements, FIG. 4 is a timing diagram that describes the ranging method of the present disclosure that may be used to determine the distance between two wireless devices, such as airborne measuring station 110 and a wireless target station 120. Time axis 410 is the time axis for airborne measuring station 110 and time axis 420 is the time axis for target station 120. At time Ta 411, airborne measuring station 110 starts the transmission of ranging packet 412 which is addressed to target station 120. After a time-delay of td, at time Tb 421, target station 120 starts to receive ranging packet 412. At time Tc 415, airborne measuring station 110 completes the transmission of ranging packet 412 and at time Td 422, target station 120 completes the reception of ranging packet 412. The time difference between Tc 415 and Td 422 is td 431, the propagation time for the packet to travel from airborne measuring station 110 to target station 120. Note that the time differences (Tc–Ta) and (Td–Tb) are both the duration tp 430 of the transmitted ranging packet 412.

Target station 120 transmits the response packet 425 at time Te 423. Assuming that the response packet 425 is an ACK or an RTS packet in reply to the received ranging packet 412, time Te 423 ideally will be at a time $t_{SIFS}$ 432 after time Td 422, where $t_{SIFS}$ 432 is the SIFS time as defined in the IEEE 802.11 standard. At time Tf 413, airborne measuring station 110 starts to receive the response packet 425. At time Tg 424, target station 120 completes the transmission of the response packet 425 and at time Th 414, airborne measuring station 110 completes receiving the response packet 425. Note that the time differences (Tb–Ta), (Td–Tc), (Tf–Te) and (Th–Tg) are all equal and have the value td which is the propagation time for the ranging packet 412 and the response packet 425 to travel between the two stations.

At airborne measuring station 110, the time of a packet at the point when the frame check has completed, may be recorded. Hence, the time for the transmission of ranging packet 412 that is recorded may be Tc 415, and the time that is recorded for the reception of the response packet 425 may be Th 414. In order to calculate the value of td, it is desirable to know the duration tr 434 of the response packet 425. The duration of an ACK or CTS packet is defined in the Standard and hence is known. In practice therefore, airborne measuring station 110 can calculate the value of td from expression (2):

$$td=(Th-Tc-tr-t_{SIFS})/2 \quad (2)$$

and hence the corresponding distance, $$D=td*c \quad (3)$$

Stated another way, airborne measuring station 110 begins transmission of ranging packet 412 at a beginning transmission time Ta 411 and ends transmission of the ranging packet 412 at an ending transmission time Tc 415. Airborne measuring station 110 begins receiving of the response packet 425 at a beginning reception time Tf 413 and receives the complete response packet 425 at an ending reception time Th 414, wherein RTT is measured as the time between the ending reception time Th 414 and the ending transmission time Tc 415, and TOF is RTT minus the duration of the response packet tr 434, minus tsws 432, divided by 2. In the general sense ranging packets may be sent at either regular intervals or in bursts. The time Tp 450 is the time between successive ranging packets either within a burst or continuous.

A reception window Trw 400 may be defined. The reception window starts at time Ts 409 after the end of the transmission, Tc 415 of ranging packet 412 and ends at time Tt 419 after the end of the transmission, Tc 415 of ranging packet 412. For example, the reception window Trw may be set to start at time Ts 409, 20 µs after time Tc 415, and end at time Tt 419, 70 µs after time Tc 415. In this example the duration of the reception window Trw 400 is 50 µs.

Figure 5:
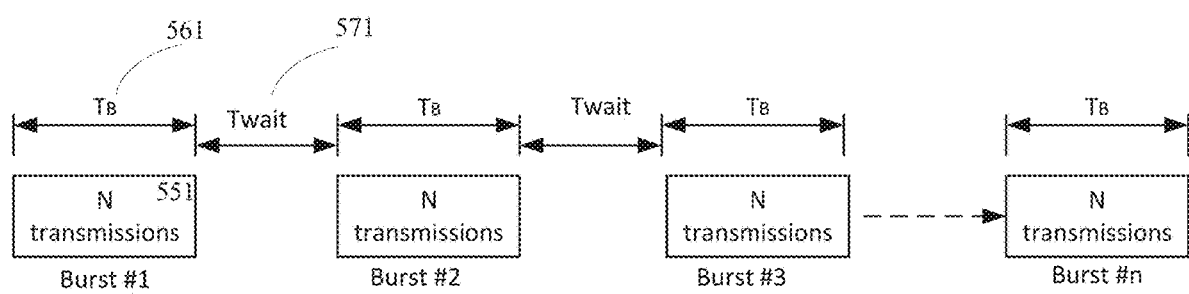
FIG. 5 is a timing diagram of a series of bursts of transmissions of the ranging packets.

FIG. 5 is a timing diagram of a series of bursts of transmissions of the ranging packets 412. In one embodiment of this disclosure, a "burst", 551, including a preset number N of transmissions of packets 412 from airborne measuring station 110 may be sent followed by a "wait" period, 571. This sequence may continue until a command may be issued to terminate the transmissions. Within each burst, each of the N transmissions may be separated by a preset time, Tp 450. The duration TB 561 of each burst will therefore be N Tp. For example, a burst may include 100 transmissions of packets 412 from airborne measuring station 110, each transmission, say, 1 ms apart, followed by a wait period of, say, 30 ms after which another burst of 100 transmissions may be sent. In this example the duration of each burst will be 100 ms.

In one non-limiting embodiment used to describe the functions and concepts herein, a DSSS CTS and a DSSS ACK packet, have 304 bits:
 128 scrambled 1 s;
 16 bit SFD (start of frame delimiter);
 48 bit header;
 14 Bytes payload;
  2 Byte Frame Control;
  2 Byte Duration field;
  6 Byte Receiver Address (RA);
  4 Byte Frame Check Sum (FCS).

A 1 Mbps DSSS packet uses an 11 bit Barker code to spread the signal. Each bit is represented by the 11 bit code either as is, for a 1, or inverted, for a 0. Hence there is a processing gain (PG) of approximately 10 dB (PG=10 log 11). The modulation is binary phase shift keying BPSK.

The probability of a bit error, Pb, for BPSK, is $$Pb=0.5 erfc\sqrt{E_b/N_0} \quad (4)$$

Where "erfc" is the Gauss complimentary error function
 $E_b$ is energy per bit
 $N_0$ is noise per hertz For BPSK, $E_b/N_0$ is equal to the signal to noise ratio, SNR.

The packet error rate, PER, is related to the bit error, Pb by the expression $$PER = 1 - (1-Pb)^M \quad (5)$$

Where M is the number of bits in the packet
For example, for a packet error rate PER=0.7, with B=304, from equations (4) and (5) Pb=0.00386 which is Eb/No=SNR=5.5 dB.
With the 10 dB processing gain (11 bit Barker code), this is equivalent to an input SNR=−4.5 dB.
The received signal level may be calculated using the standard formula:

$$Pr = 10 \log(1000 \, K \, T) + 10 \, \text{Log BW} + NF + SNR \text{ dBm} \quad (6)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for DSSS and assuming NF=3 dB and SNR=−4.5 dB, from (6)
Pr=−102.5 dBm.

A receiver sensitivity of −102.5 dBm for a 70% packet error rate (PER) represents an ideal situation with no implementation losses.

If all the bits of the CTS or ACK are known in advance, then the received bits may be compared to the expected bits. If enough of the received bits match the expected bits, then a decision may be made that the CTS or ACK had indeed been detected. This technique is known as correlation where the decision may be based upon a correlation threshold, i.e. how many of the received bits match the expected received bits.

In the general sense, correlation works by passing the known bit pattern across the noisy bit pattern, and if the bits agree, they add, if not the bits subtract.

For a packet of M bits, M.Pb bits will not match and M(1−Pb) will match,

Hence Correlation=(Match−Mismatch)/Total or Correlation=$(M-2\,M.Pb)/M = (1-2\,Pb)$ (7)

Hence, for $Pb=0.2$, Correlation=$(1-2\times 0.2)=0.6$ or 60%

Note that for pure noise, Pb=0.5 and hence 152 bits will agree (match), 152 will not agree (mismatch) and correlation will be 0%.

If the raw detected 304 bits of the DSSS CTS or DSSS ACK packets are correlated across the known bits of the complete packet, then it is possible to detect a CTS or ACK packet that is well below the noise level.

For a given SNR, the bit error Pb may be calculated using equation (6) and the correlation % calculated using equation (7). The variance and standard deviation, σ, of the mismatched bits may be calculated:

$$\sigma^2 = M\,Pb(1-Pb)$$

$$\sigma = \sqrt{MPb(1-Pb)} \quad (8)$$

For M bits, the number of mismatched bits is M Pb, with a standard deviation of σ. Hence, mismatched bits=M.Pb±σ, and the number of matched bits is M−(M.Pb±σ).
Thus, the correlation from equation (7) expressed as mean±standard deviation, is given by:

$$\text{Correlation} = (M - (MPb \pm \sigma) - (MPb \pm \sigma))/M \quad (9)$$

$$= 1 - 2Pb \pm 2\sigma/M$$

Comparing (9) to (7), the following associations can be made:

$$\text{Correlation mean} = (1-2Pb) \quad (10)$$

$$\text{and Correlation standard deviation} = 2\sigma/M. \quad (11)$$

Noise has a bit error rate, Pb=0.5 with a mean of zero and, from equation (8), $\sigma = \sqrt{M/4}$, and from equation (11)

$$\text{noise correlation standard deviation} = \sqrt{1/M} \quad (12)$$

Hence, the effective "3σ correlation" for thermal noise is 3$\sqrt{1/M}$, i.e. for M=304, thermal noise 3σ correlation=0.172 or 17.2%.

Figure 6:
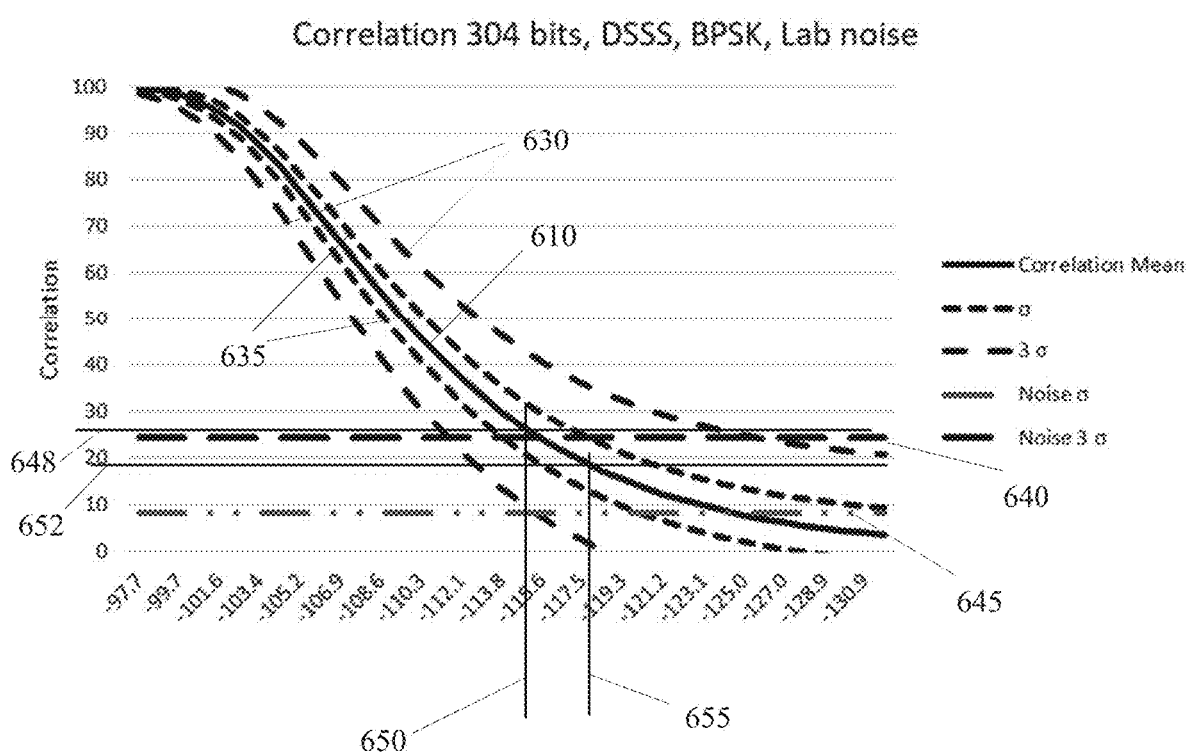
FIG. 6 is a graph of Correlation % versus received signal power Pr for 304 bits.

FIG. 6 is a graph of Correlation % versus received signal power Pr for M=304 bits for laboratory, "Lab", conditions. For a given received signal strength Pr, the SNR is calculated using equation (6) assuming a noise figure of 3 dB. The SNR is used to determine the bit error rate Pb using equation (4). The correlation mean 610 is calculated using equation (10). The one σ correlations 635 and the three σ correlations 630 plots are calculated using equations (10) and (11). The 3 σ and one σ correlation values for noise, 24.3% and 8.1%, 640 and 645, respectively, are calculated using formula (12), and then multiplied by √2 to account for the 3 dB noise figure.

As discussed above with reference to FIG. 4, the correlation may be performed for the duration of a reception window Trw 400. As an example the duration of a reception window may be 50 μs and at a typical sampling rate of 20 MS/sec there may be 1000 correlation values in the reception window of which only one would correspond to the wanted. In order to be detected, the correlation peak of the wanted signal, the response packet 425, must be greater than the highest peak due to noise, but there are 1000 correlations due to noise. The Gumbel distribution may be used to describe the distribution of the maximum of a sample size n, where, for example n=1000. The probability that the singular signal correlation will exceed the highest of all of the noise correlations is found by integrating, over all correlations, the Gumbel probability distribution (of highest noise correlation) times the probability that the signal exceeds that correlation, i.e. (1−CDF).

The probability, Pw, that the wanted correlation is greater than the peak noise correlation is $$P_W = \int \mathcal{G}u(x;\mu,\beta) \cdot [1 - \mathcal{F}(x)]dx \quad (13)$$

Where $\mathcal{G}u(x; \mu, \beta)$ is the Gumbel PDF of noise with location μ, scale β for a value of n And $[1-\mathcal{F}(x)]$ is the complement cumulative distribution function (1−CDF) of the normal distribution of the wanted signal correlation with mean and standard deviation as per equations (10) and (11).

Table 1 shows the probability of the wanted correlation peak being higher than the maximum peak of the noise correlations as the correlation mean varies for thermal, lab and suburban noise conditions, for n=1000. The noise is assumed to be 3 dB higher than thermal for lab conditions, and 6 dB higher for suburban conditions.

TABLE 1

Probability that the Wanted correlation is highest

| Corr Mean % | Prob Wanted Peak Wins % | | |
|---|---|---|---|
| | Thermal | Lab | Suburban |
| 90 | 100 | 100 | 100 |
| 85 | 100 | 100 | 100 |
| 80 | 100 | 100 | 100 |
| 75 | 100 | 100 | 100 |
| 70 | 100 | 100 | 100 |
| 65 | 100 | 100 | 100 |
| 60 | 100 | 100 | 100 |
| 55 | 100 | 100 | 99 |
| 50 | 100 | 100 | 97 |
| 45 | 100 | 100 | 88 |
| 40 | 100 | 98 | 67 |
| 35 | 100 | 91 | 38 |
| 30 | 97 | 72 | 14 |
| 25 | 86 | 41 | 3 |
| 20 | 59 | 15 | 0 |
| 15 | 27 | 3 | 0 |
| 10 | 7 | 0 | 0 |
| 5 | 1 | 0 | 0 |

Referring again to FIG. 6, in a burst, 551, of N=100 transmissions, with reference to Table 1, for a correlation mean of 26%, 648, there is about a 50% probability that the wanted peak is detected, or, in a burst of 100 transmissions, the wanted peak will be detected 50 times and a noise peak will win 50 times. This corresponds to a signal level of about −114 dBm 650. For a correlation mean of about 18% 652, there is a 10% probability that the wanted peak is detected, corresponding to a signal level of about −117 dBm 655. Dropping the correlation threshold from 26% to 18% increases the sensitivity by 3 dB but out of the 100 results, only 10 will be the wanted peak and 90 will be noise peaks.

FIG. 6 represents the results using equations (4) to (11) which assume laboratory noise. In many scenarios the airborne measuring station 110 will be receiving many different signals from a large area on the ground, and the background noise level may be significantly higher than thermal noise and may be variable dependent upon the environment, i.e. open, rural, suburban or urban.

Figure 7:
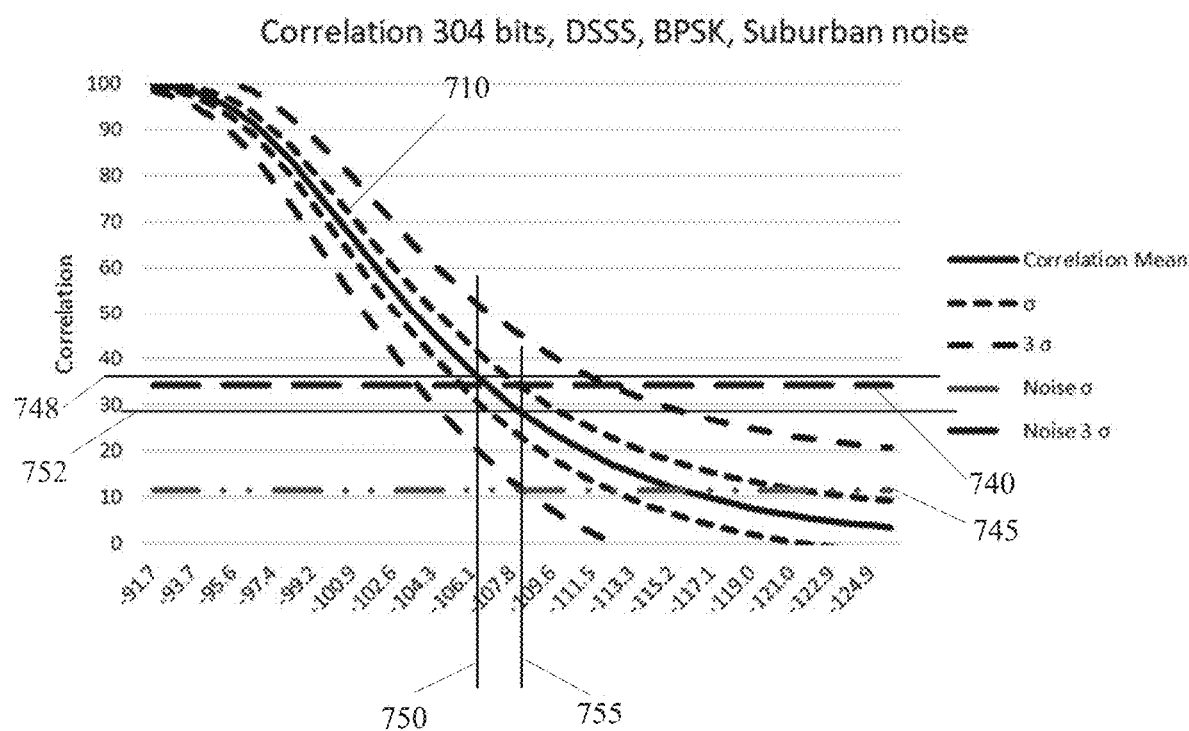
FIG. 7 is a graph of Correlation % versus received signal power Pr for 304 bits but with a noise 3σ level displayed that represents a suburban environment where the background noise is assumed to be higher than thermal noise by 6 db.

FIG. 7 is a graph similar to the graph of FIG. 6 (Correlation % versus received signal power Pr for 304 bits) but with a noise a 745 and 3a level 740 displayed that represents a suburban environment where the background noise is assumed to be 6 dB higher than thermal. The correlation mean 710 curve is similar to that in FIG. 6, 610, but the signal levels, Pr, are 6 dB higher so as to maintain the required SNR. With reference to Table 1, at a correlation threshold of 37% 748 the correlation mean 710 corresponds to a theoretical signal level of about −106 dBm, 750, which corresponds to the level at which it is to be expected that the wanted signal will be greater than the peak noise level for 50% of the time. If the correlation threshold is lowered to about 29% 752, a wanted theoretical signal level of about −108 dBm 755 results but with the probability that a wanted peak will exceed the noise peak only 10% of the time.

As discussed above with reference to FIGS. 6 and 7, in the case of lab noise as shown in FIG. 6, a correlation threshold of about 26% may be chosen, in order to minimize the correlations due to noise, but in the case of suburban noise, as shown in FIG. 7, a correlation threshold of about 37% may have to be chosen. Choosing a correlation threshold too low may result in the ratio of false RTT to true RTT measurements being too high resulting in the geo-location calculations failing. Choosing a correlation threshold that is too high may result in the ratio of false RTT to true RTT measurements being low, but reduces the sensitivity.

Figure 1:
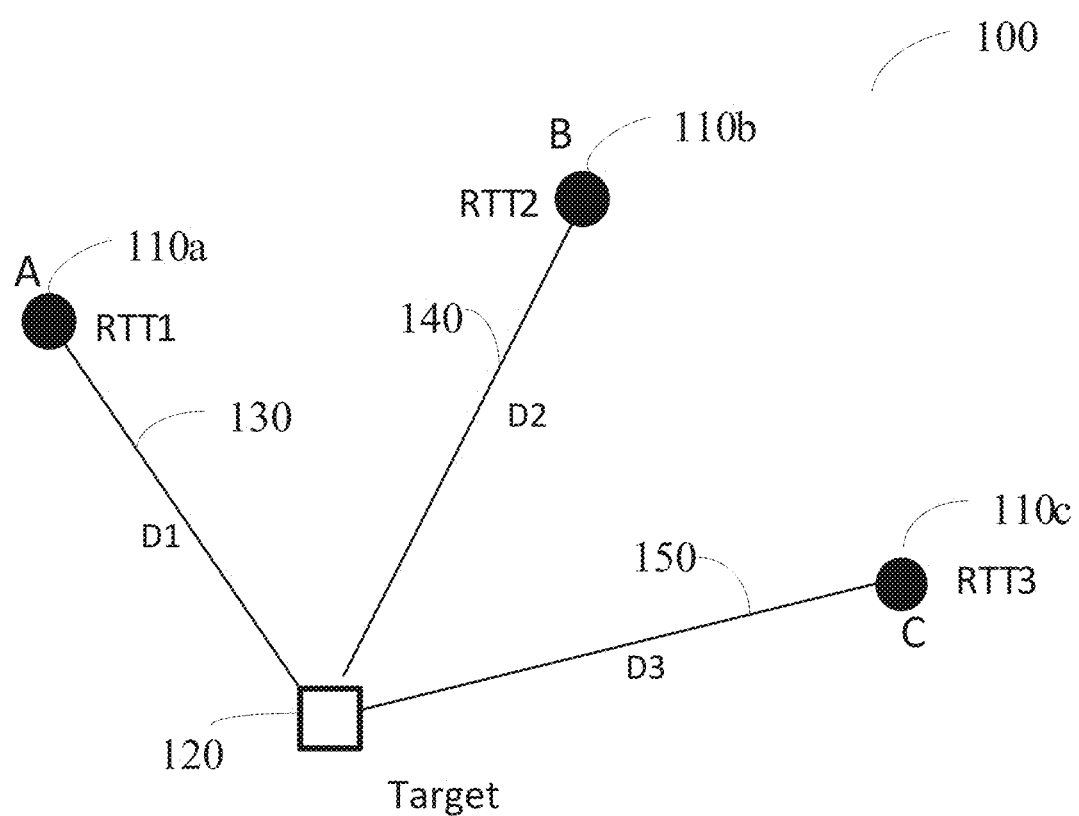
FIG. 1 is a diagram of a typical location system which includes three measuring stations.
Figure 2:
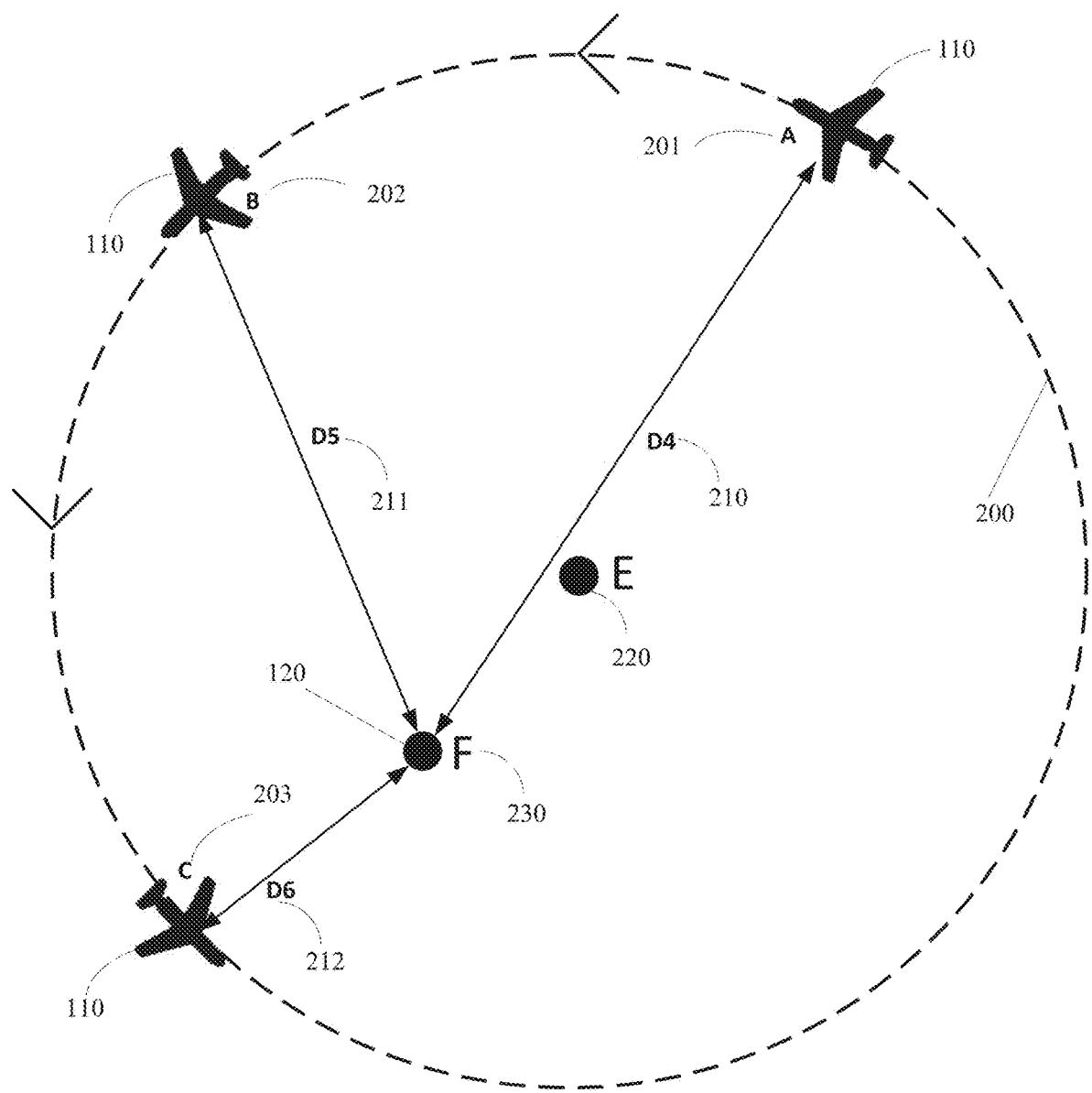
FIG. 2 is a diagram of an airborne measuring station actively geo-locating target stations.
Figure 3:
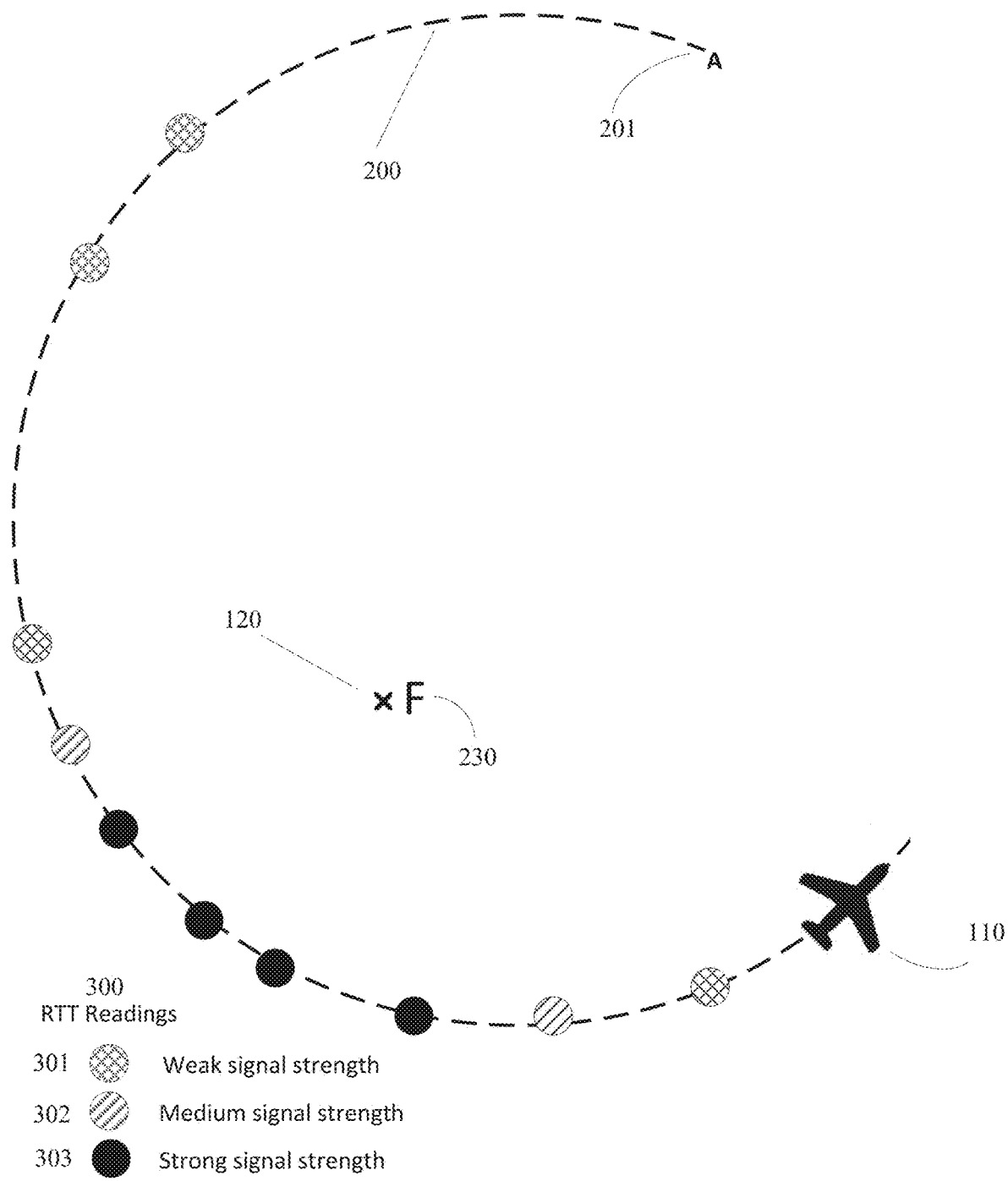
FIG. 3 is an example diagram of an airborne measuring station depicted being flown in the circular orbit around a target station.
Figure 8:
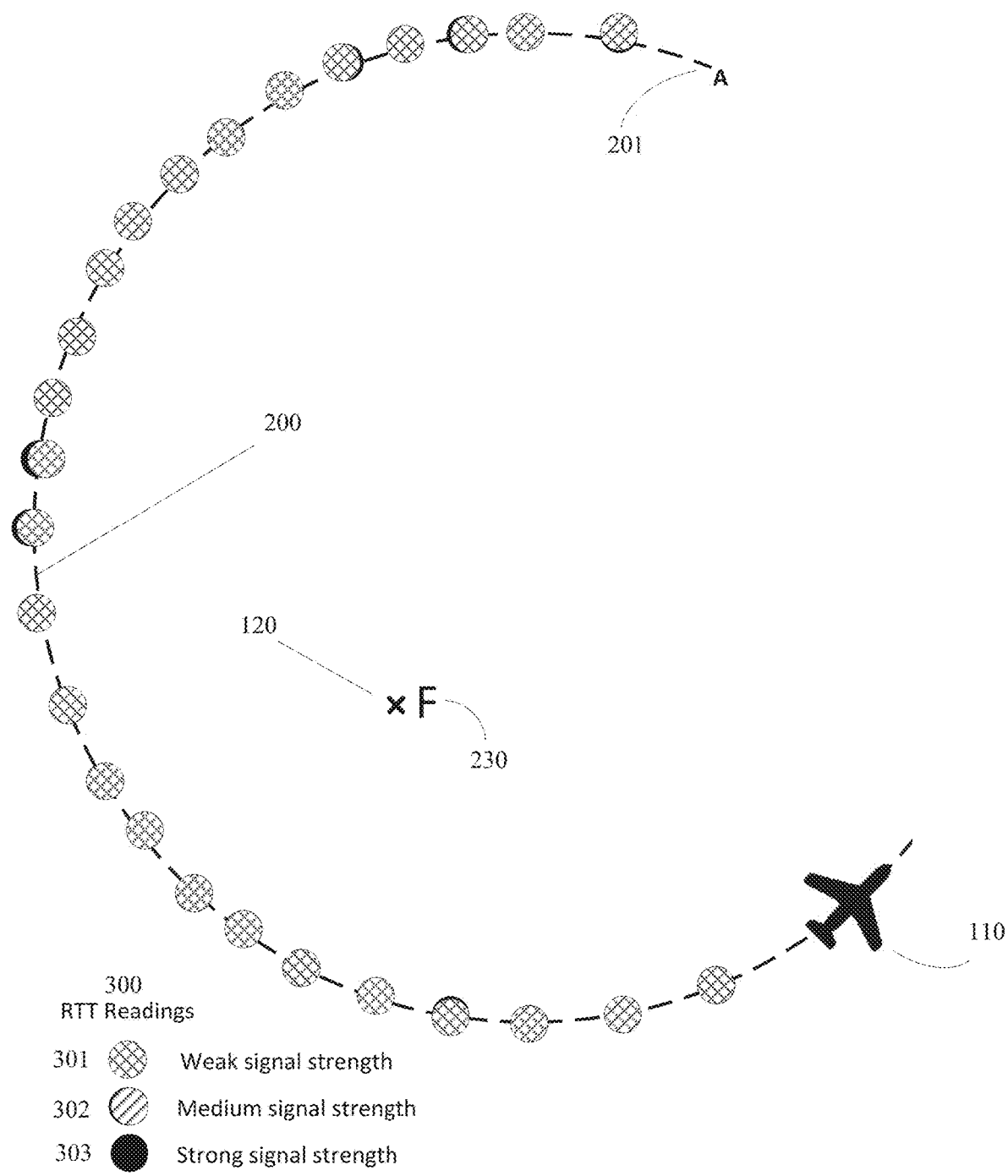
FIG. 8 is an example diagram of an airborne measuring station depicted being flown in the circular orbit around a target station.

FIG. 8 is similar to FIG. 3 and is an example diagram of an airborne measuring station 110 depicted being flown in the circular orbit 200, starting at point A 201, around a target station 120 at location F 230. In FIG. 8 the heatworm indications of received packets and RTT readings represent an example corresponding to where the correlation threshold is lowered such that there are unwanted RTTs due to noise as well as possibly weak wanted signals 301. In such a scenario an operator may assume that wanted packets are being received at every point on the orbit, whereas, in fact, no wanted packets are being received. An intention of the heatworm is to indicate that wanted response packets 425 from the target station 120 are being received and hence the operator may, for example, infer that the airborne measuring station 110 is on the correct channel, and that a geo location of the target station 120 is likely. Hence, there is a need for a method that provides a clear indication of successfully received wanted response packets 425.

Figure 9:
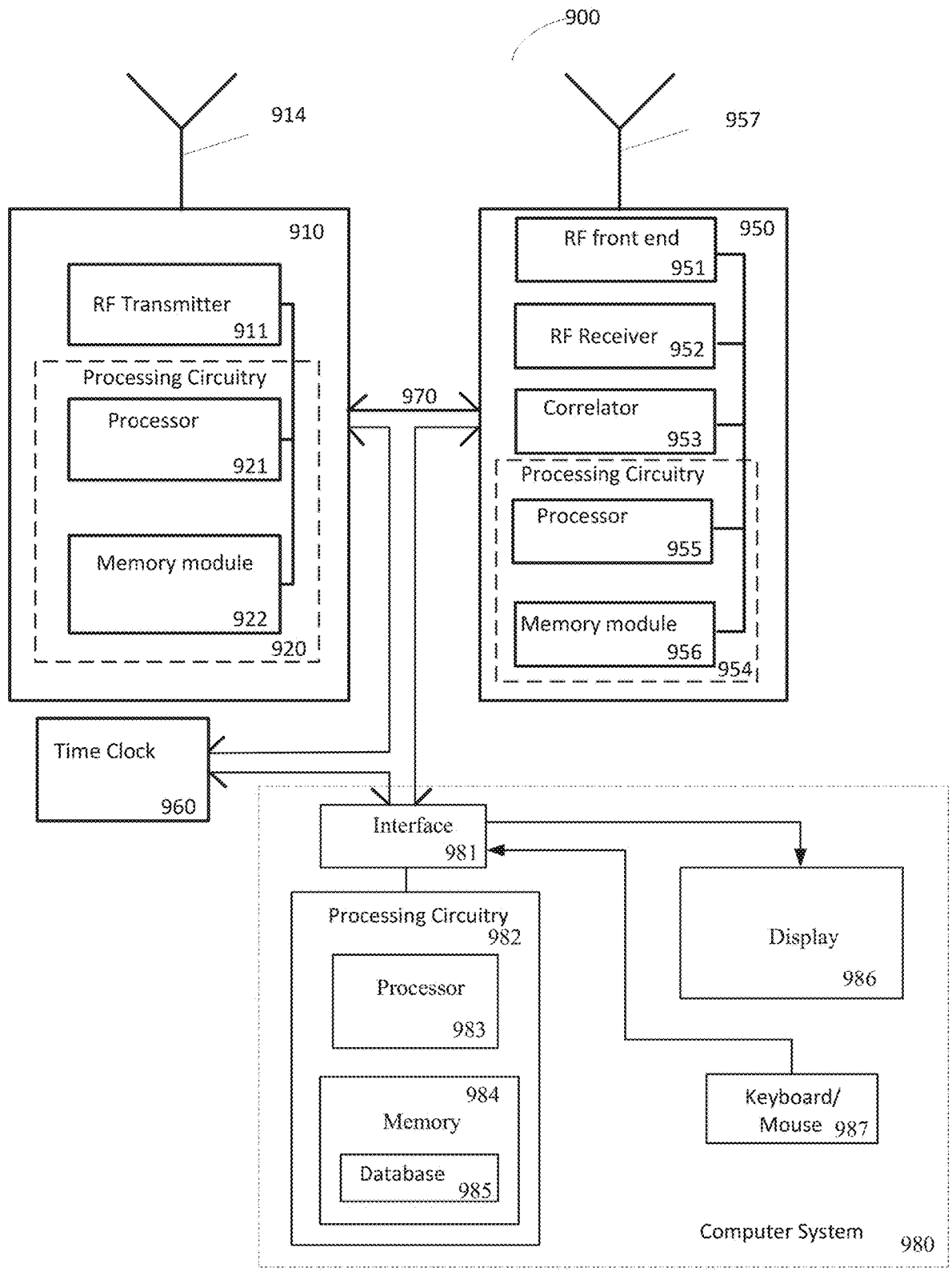
FIG. 9 illustrates a block diagram of an example wireless communication device.

FIG. 9 illustrates a block diagram of an example wireless communication device 900 which, according to an embodiment of the disclosure, may be used as or as part of the airborne measuring station 110, i.e., a new version of the airborne measuring station 110.

The wireless communication device 900 may be a device capable of wirelessly receiving signals and transmitting signals and may be configured to execute any of the methods of the Standard. Wireless communication device 900 may be one or more stations or access points, and the like. Wireless communication device 900 may be one or more wireless devices that are based upon the Standard and each may be configured to act as a transmitter or a receiver. The embodiment described herein is that where wireless communication device 900 includes a wireless transmitter 910 and a wireless receiver 950. The wireless communication device 900 may also include a time clock 960 and a computer system 980 which are interconnected to the wireless transmitter 910 and the wireless receiver 950 by a data bus 970.

In some embodiments, the wireless transmitter 910 includes an RF transmitter 911 and processing circuitry 920 that includes processor 921, and memory module 922. The wireless transmitter 910 also includes one or more wireless antennas such as wireless antenna 914. The RF transmitter 911 may perform the functions of spreading, and DSSS modulation, as described in the Standard, and amplification for the transmission of the DSSS packets via the antenna 914. In some embodiments, the processing circuitry 920 and/or the processor 921 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, some functions of the RF transmitter 911 may be performed by the processing circuitry 920. The processing circuitry 920 may be configured to control any of the methods and/or processes described herein and/or to cause such methods, and/or processes to be performed, e.g., by the RF transmitter 911. The memory module 922 may be configured to store data, programmatic software code and/or other information described herein. In some embodiments, the software may include instructions that, when executed by the processing circuitry 920, causes the processing circuitry 920 to perform the processes described herein with respect to the wireless transmitter 910.

In some embodiments, the wireless receiver 950 includes an RF front end 951, an RF receiver 952, a correlator 953, processing circuitry 954 (that includes a processor 955 and a memory module 956) and one or more wireless antennas such as wireless antenna 957. In some embodiments, wireless receiver 950 and wireless transmitter 910 may share one or more antennas, together with appropriate combining and splitting circuitry. The RF front end 951 may perform the usual functions of an RF receiver front end such as low noise amplification, filtering, and frequency down conversion so as to condition the received signal suitable for inputting to the RF receiver 952. The RF receiver 952 may perform the functions of demodulation and de-spreading of the DSSS packet so as to condition the received signal suitable for inputting to the correlator 953. The correlator 953 may perform the function of correlating the conditioned, demodulated received bits with a known expected bit pattern. In some embodiments, the RF receiver 952 and/or the correlator 953 and/or the processing circuitry 954 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, the functions of the RF receiver 952 and/or the correlator 953 may be performed by the processing circuitry 954. The processing circuitry 954 may be configured to control any of the methods and/or processes described herein and/or to cause such methods, and/or processes to be performed, e.g., by the wireless receiver 950. The memory module 956 is configured to store data, programmatic software code and/or other information described herein. In some embodiments, the software may include instructions that, when executed by the processing circuitry 954, causes the processing circuitry 954 to perform the processes described herein with respect to the wireless receiver 950.

According to this embodiment of the disclosure, the wireless receiver 950 may be configured to measure and monitor an input signal's attribute, such as may include one or more of a ranging signal transmitted by wireless transmitter 910, data and control packets, and the response signal, including control packets, transmitted by an access point or station that may be based upon the Standard. Such packets may include data null, ACK, RTS and CTS packets. The memory module 956 may store instructions for executing any method mentioned in the Standard, input signals, and results of processing of the processor 955, signals to be outputted and the like.

According to an embodiment of the disclosure, the RF transmitter 911 may be configured to transmit signals and the processing circuitry 920 may be configured to prepare the transmitted signal attributes based upon the Standard. Such transmitted packets may include data packets, control packets and management packets that are to be transmitted by a wireless station that is based upon the Standard. Such data packets may include data null packets. Such control packets may include RTS packets. The memory module 922 may store instructions for executing any method mentioned in the specification, input signals, and results of processing of the processor 921, signals to be outputted and the like.

According to another embodiment of the disclosure, the wireless receiver 950 may be configured to receive the transmissions of another target station 120 and the processing circuitry 954 may be configured to monitor an attribute of the transmissions of the other wireless communication device, and determine the value of the time of arrival of packets from the other wireless communication device. In addition, according to an embodiment of the disclosure, the wireless receiver 950 may be configured to measure the times of departure of the transmissions from the wireless transmitter 910. These times may be accomplished by outputting a trigger that is timed to coincide with the reception packet from the other target station 120 or the wireless transmitter 910. This trigger may then be used to read the time from the time clock 960. Time clock 960 may have a precision that is higher than the internal timing synchronization function (TSF) timer that is part of the wireless receiver 950.

According to an embodiment of the disclosure, the wireless transmitter 910 may be configured to transmit bursts 551 of packets to another wireless communication device, as described in FIG. 5, and the processor 921 may be configured to prepare the attributes of the ranging packet 412 to be transmitted. Processor 921 may also be configured to set the timing Tp 450 between each ranging packet 412 transmission, the number N of ranging packet 412 transmissions within each burst, the wait time Twait 571 between bursts, as well as the start and stop times for the sequence of bursts.

According to an embodiment of the disclosure, a computer system 980 may be used to control the operations of the wireless communication device 900 and in particular the wireless transmitter 910 and wireless receiver 950. The computer system 980 may include an interface 981. Interface 981 may contain a connection to the wireless transmitter 910, the wireless receiver 950, the time clock 960, the connection to a display 986, a connection to a keyboard and mouse 987 as well as interfacing to the processing circuitry 982. In some embodiments, the processing circuitry 982 may include a processor 983, a memory 984, and a database 985. The database 985 may contain the ground mapping information of the area of interest and the processor 983 and memory 984 may be used to carry out processes for the geo-location of the target station 120, using the output of the correlator 953 and the RTT calculations derived in the processing circuitry 954 of the wireless receiver 950, plus information on the position of the wireless communication device 900 which may be inputted from external devices such as a GPS module, and information on the target station 120 which may be inputted using the keyboard and mouse 987. The display 986 may be used to show the ground map together with the indication of received response packets 425 from the target station 120 and, if available, the estimated location of the target station 120. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 982 may include the memory 984 and a processor 983, the memory 984 containing instructions which, when executed by the processor 983, configure the processor 983 to perform the one or more functions described herein. In addition to a traditional processor and memory, the processing circuitry 982 may comprise integrated circuitry for processing and/or control, e.g. one or more processors and/or processor cores and/or FPGAs (Field Programmable Gate Array) and/or ASICs (Application Specific Integrated Circuitry).

The processing circuitry 982 may include and/or be connected to and/or be configured for accessing (e.g., writing to and/or reading from) the memory 984, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 984 may be configured to store code executable by control circuitry and/or other data, e.g., data pertaining to communication, e.g., configuration and/or address data of nodes, etc. The processing circuitry 982 may be configured to control any of the methods described herein and/or to cause such methods to be performed, e.g., by the processor 983. Corresponding instructions may be stored in the memory 984, which may be readable and/or readably connected to the processing circuitry 982. In other words, the processing circuitry 982 may include a controller, which may comprise a microprocessor and/or microcontroller and/or FPGA (Field-Programmable Gate Array) device and/or ASIC (Application Specific Integrated Circuit) device. It may be considered that the processing circuitry 982 includes or may be connected or connectable to memory, which may be configured to be accessible for reading and/or writing by the controller and/or processing circuitry 982. It is also noted that the elements of the wireless communication device 900 can be included in a single physical device/housing or can be distributed among several different physical devices/housings.

Figure 10:
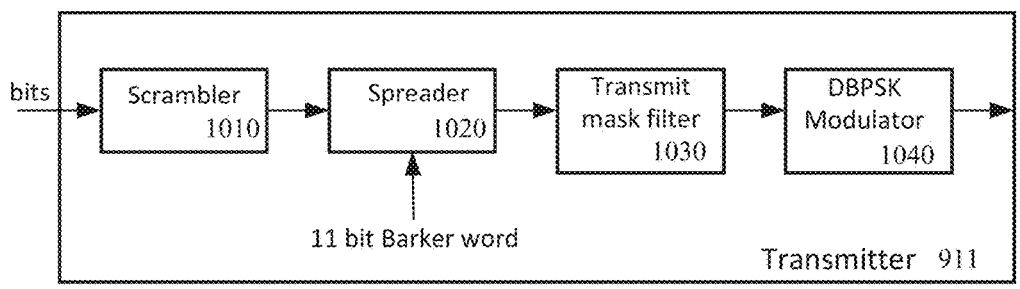
FIG. 10 is a functional block diagram of an example of a DSSS RF transmitter.

FIG. 10 is a functional block diagram of an example of a DSSS RF transmitter 911. The bits to be transmitted are first passed through a scrambler 1010. All information bits are scrambled by a self-synchronizing 7-bit polynomial $G(z)=z^{-7}+z^{-4}+1$, as described in the Standard. The Standard allows for a random seed for the DSSS physical layer, Clause 15, but for the High Rate DSSS (HR/DSSS) physical layer, Clause 16, a fixed seed is defined. In practice the fixed seed is used by the vast majority of devices for both DSSS and HR/DSSS. The scrambled bits are then passed to the spreader block 1020 where the bits are spread with the 11 bit Barker code. The resulting spread spectrum signal is then filtered by a transmit mask filter 1030 and then modulated by differential binary phase shift keying (DBPSK) by the modulator block 1040.

Assuming that the scrambler seed is known, then all the raw scrambled bits in the CTS or ACK packet are known. As defined in the Standard, the Preamble and Header bits are common for all CTS and ACK packets, and the Frame Control bits will also be common for each CTS or ACK packet. The Duration field is based upon the Duration field of the transmitted ranging packet 412 and hence may be set to a unique value. Also, the receive address (RA) field is set to the transmitter address (TA) field of the transmitted ranging packet 412 and hence will also be unique. The frame check sum (FCS) field will therefore be unique due to the uniqueness of the Duration and RA fields. Hence, in this example, of the 304 bits, up to 96 bits will be unique. A spurious received packet would therefore have 96 incorrect bits, equivalent to a correlation % of only 36%. The correlation is taken across the complete packet of 304 bits.

Figure 11:
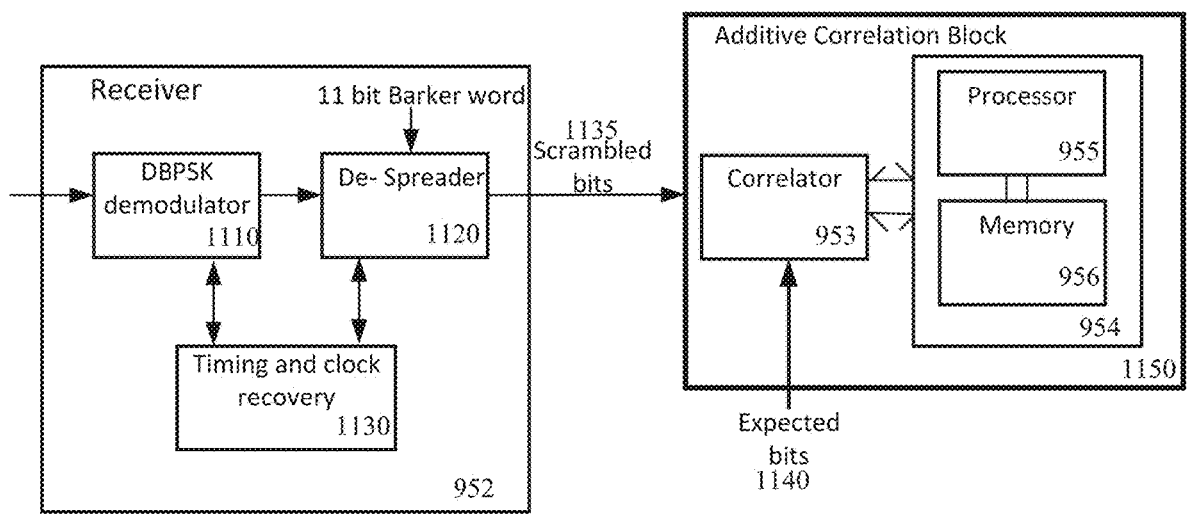
FIG. 11 is a functional block diagram of an example of an RF receiver and additive correlation block.
Figure 12:
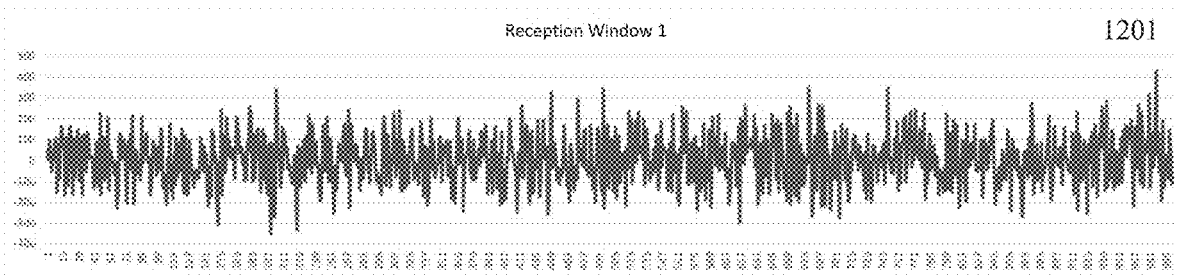
FIGS. 12-16 are a set of plots that illustrate the combining of detection windows.
Figure 13:
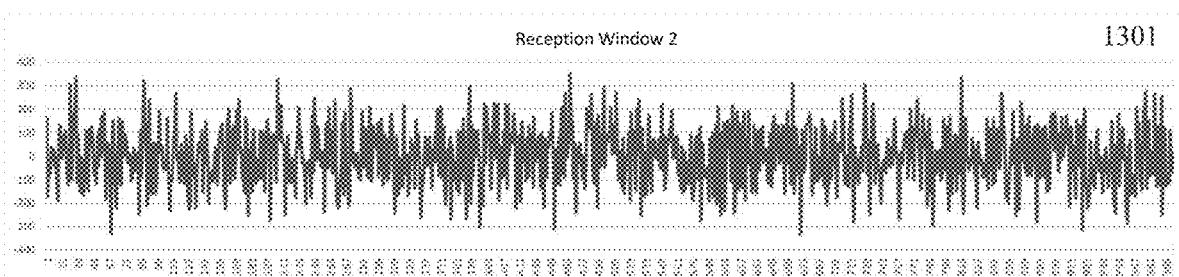
Figure 14:
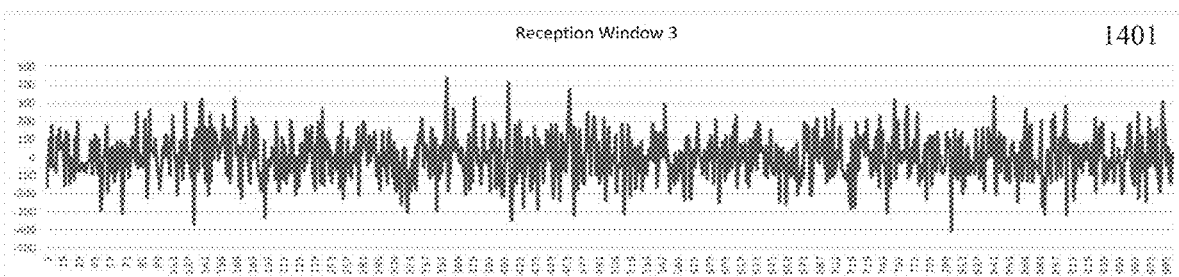
Figure 15:
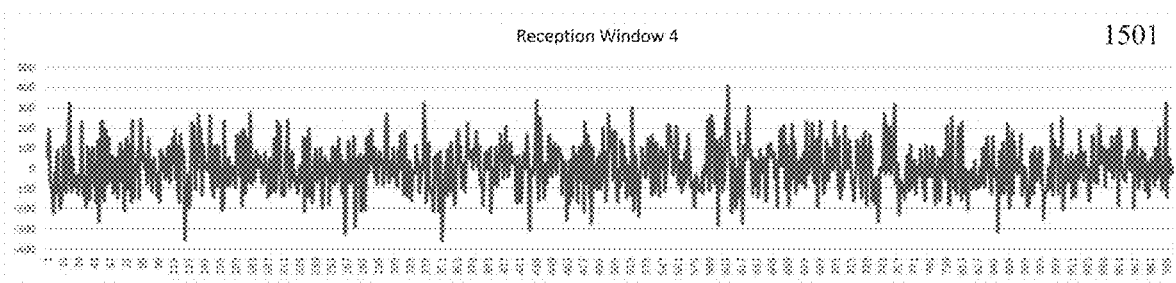

FIG. 11 is a functional block diagram of an example of an RF receiver 952 and additive correlation block 1150, according to one example of this disclosure. The received DSSS signal is demodulated and de-spread with the 11-bit Barker code in the DBPSK demodulator 1110 and the de-spreader 1120 respectively. A timing and clock recovery block 1130 may be used to aid in this process. In cases where the response packet is below the noise level, the output of scrambled bit stream 1135 of the de-spreader 1120 will include the raw, scrambled bits that may or may not contain the expected response packet. These raw bits may be inputted to an additive correlation block 1150 comprising the correlator 953 and processing circuitry 954 (which includes processor 955 and memory module 956). The additive correlation block 1150 may perform the function of additive correlation as described below with reference to FIG. 12.

The process of "additive correlation" across bursts is now described.

For each exchange of the ranging and response packets, 412 and 424 respectively, as described above with reference to FIG. 4, an RTT may be measured by correlating the received signal of the response packet raw bits with the expected bits, as described above with reference to FIGS. 6, and 7. A correlation threshold may be selected and if the received bit stream correlates above this threshold, then the time of reception of the response packet 425 may be measured and compared to the time that the ranging packet 412 was transmitted in order to produce an RTT. In order to increase sensitivity, the correlation threshold may be set to a low value but this increases the possibility of false correlations due to noise. As described above with reference to FIG. 4 and FIG. 5 a series of bursts of transmissions may be used. "Additive correlation" exploits the likelihood that the wanted response packets 425 will occur at the same time in each reception window 400 for each of the N transmissions during a burst 551. The process is to combine the results from all the reception windows in a burst so as to accumulate the "wanted" correlation peaks that occur around the same time in each reception window while rejecting the other unwanted correlation peaks which will be occurring at random times in each reception window. A correlation threshold is not used with additive correlation.

Assuming that the sampling rate is S samples per second, a correlation value c may be produced for every sample. During the reception window 400 a set of correlation values, C, may be derived. Hence, $C=(c_1, c_2, \ldots c_W)$ where W is the number of samples in the reception window.

Figure 16:
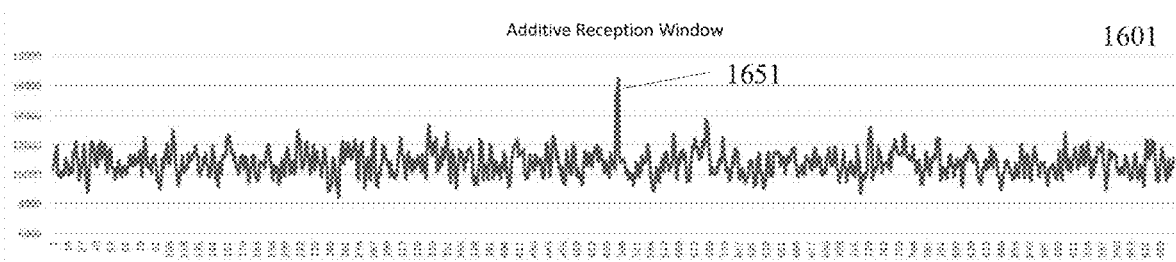

FIGS. 12, 13, 14, 15 and 16 are a set of plots that illustrate the combining of correlations in a number of reception windows. Plots 1201, 1301, 1401, and 1501 are graphical representations of the output of correlator 953 across the first four reception window durations 400 of a burst 551. Plot 1601 is a graphical representation of the addition of the outputs of 100 such reception windows. The wanted correlation peak 1651 in this example is above the unwanted peaks in the additive reception window of plot 1601, but in each of the individual reception windows plots, 1201, 1301, 1401, 1501 the wanted correlation peak is not the maximum peak. FIG. 16 demonstrates that by summing the results of all the correlations in the reception windows of a burst, the wanted correlation peak 1651, which is at a constant time compared to the noise peaks which are at random times, can be found even where the wanted peak is smaller than the noise peaks in each individual reception window.

With additive correlation, after each burst of N packets, the peak additive correlation is outputted.

In each reception window, n, $C_n = \{c_{n,1}, c_{n,2}, \ldots c_{n,W}\}$ where W is the number of samples in the additive reception window Additive correlation, AC, is the sum of all the reception windows in a burst, $AC = \{ac_1, ac_2, \ldots ac_W\}$ Where, For $i=1$ to $W$, $ac_i = \sum_{n=1}^{N} C_n$ Where W is the number of correlations in a reception window, and N is the number of packets in a burst.

As described above with reference to FIG. 8, only if the peak is the wanted peak should it be indicated on the orbit 200 and used for the geo-location calculations. If the peak is due to noise, then it should not be indicated on the orbit 200 or used for the geo-location calculations. An example arrangement to evaluate if the resulting additive correlation peak is due to noise or a wanted signal peak, is now described.

A parameter "Peak to Sigma Ratio", PSR, for the additive correlation is defined as the maximum peak value minus the average value, divided by the standard deviation a. The PSR value is calculated as follows:

$$\text{Average} \quad \mu = \frac{1}{W}\sum_{i=1}^{W} ac_i \quad (14)$$

$$\text{Variance} \quad \sigma^2 = \frac{1}{W}\sum_{i=1}^{W} (ac_i - \mu)^2$$

$$\text{Maximum peak,} \quad AC_{max} = \text{Max}\{AC - \mu\}$$

$$\text{Peak to Sigma Ratio,} \quad PSR = \frac{AC_{max}}{\sigma}$$

The average value of the additive correlation values is first calculated and then subtracted from each value, $ac_i$.

Figure 17:
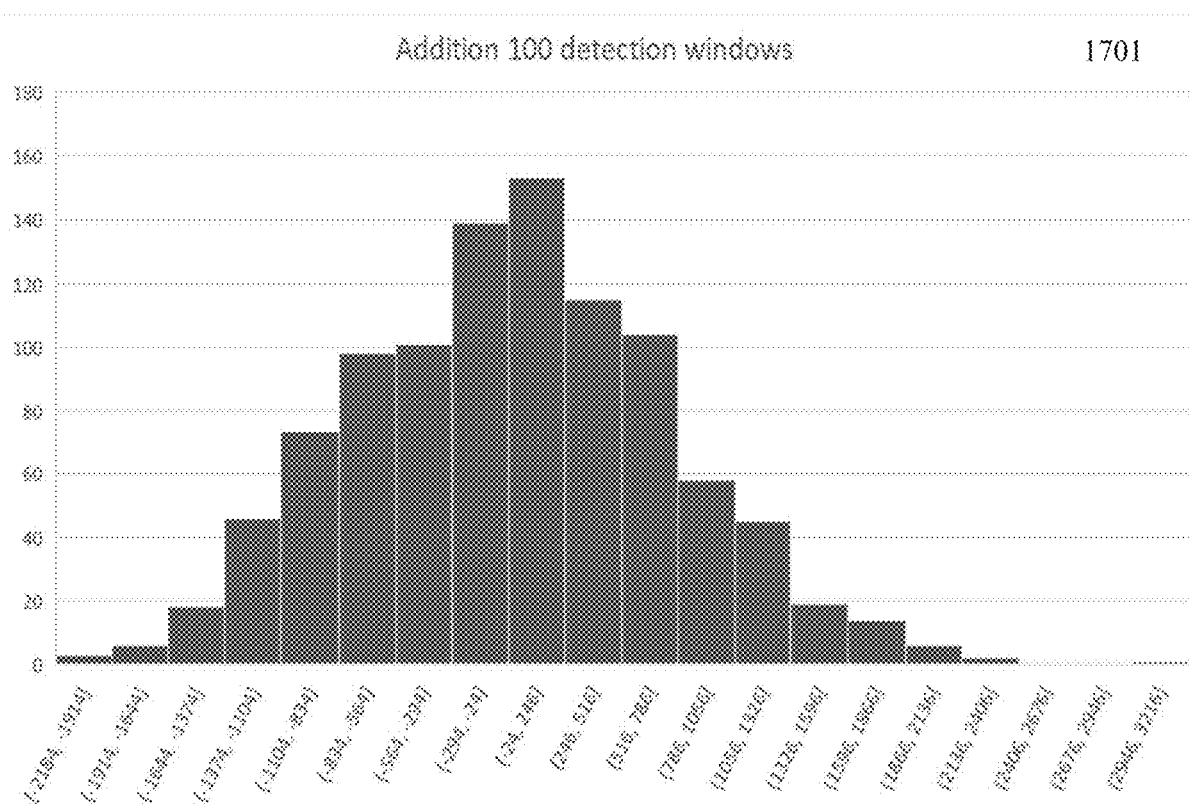
FIG. 17 is a graphical representation of the output of the additive correlator for pure noise.

FIG. 17 is a graphical representation of the output of the additive correlator for pure noise. Plot 1701 is a histogram of an example output of the additive correlation for AC={ $(ac_1-\mu)$, $(ac_2-\mu)$, ... $(ac_W-\mu)$} for pure noise, and indicates that this output is a Gumbel distribution of the extremes typical of a Normal distribution over a large number of samples, e.g., 1000 samples.

Figure 18:
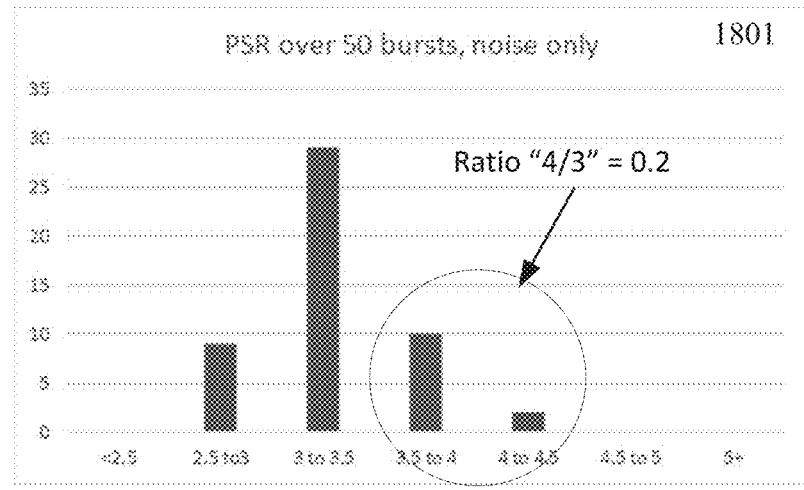
FIGS. 18-20 are a set of histograms that provide examples of the output of the PSR resulting from varying levels of wanted signal strength.
Figure 19:
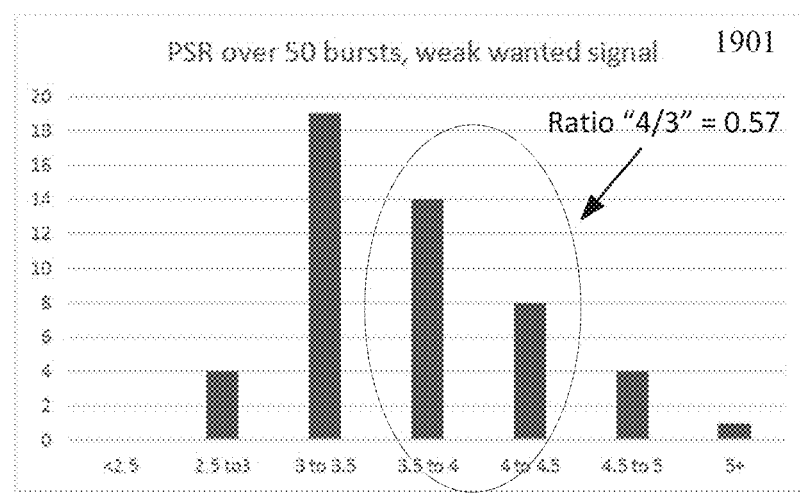
Figure 20:
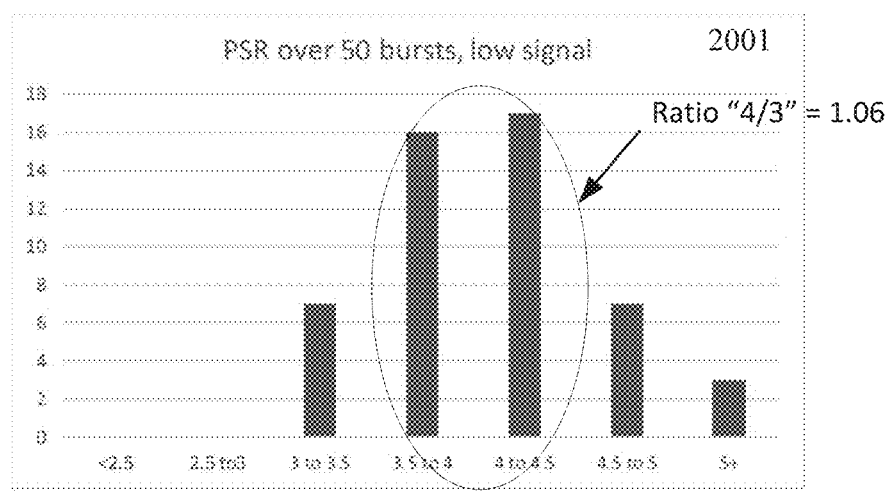

FIGS. 18, 19, and 20 are a set of histograms that provide examples of the PSR resulting from a number of bursts with varying levels of wanted signal strength. Each histogram 1801, 1901 and 2001 is a plot of the PSR values resulting from a series of 50 bursts, each burst comprising 100 transmissions as per FIG. 5. The number of samples in each window, W is 1000. Histogram 1801 is an example of the PSRs when there is no wanted signal, i.e. pure noise. As discussed above with reference to FIGS. 12 to 16, the additive correlation is Gaussian and as discussed above with reference to FIGS. 6 and 7, the distribution of the maxima is the Gumbel distribution. For example, for n=1000, the cumulative Gumbel probability function for 3a is 0.254, hence, with a burst of 100, there is a probability that a PSR over 3 will occur 100×(1−0.254), say, 74 times. The Gumbel cumulative probabilities for various multiples of the standard deviation σ, are:

| | Gumbel Cumulative Probability |
|---|---|
| 3σ | 0.253738 |
| 3.5σ | 0.788007 |
| 4σ | 0.959457 |
| 4.5σ | 0.992836 |
| 5σ | 0.998752 |

Hence, the probability that the PSR has a value between 3.5σ and 4σ, is 0.959457−0.788007=0.171449 and the probability that the PSR has a value between 4σ and 4.5σ, is 0.992836−0.959457=0.033379

A ratio "4/3" is defined as

"4/3"=Sum PSRs between 4σ and 4.5σ/Sum PSRs between 3.5σ and 4σ Hence, for noise, a theoretical value for "4/3" can be estimated "4/3"=0.033379/0.171449=0.195

FIG. 18 histogram 1801 is an example of a plot of PSR values for 50 bursts for noise. In this example the "4/3" ratio is 0.2, close to the theoretical estimate of 0.195. Histogram 1901 is an example of a plot of PSR values for 50 bursts when a very weak wanted signal is present. In this example, because the wanted signal level is weak, only 30 of the 50 bursts resulted in the wanted signal in the additive reception being the peak. In this example, the "4/3" ratio is 0.57, significantly above the "4/3" theoretical ratio of 0.195 that corresponds to pure noise. Plot 2001 is an example of a histogram of PSR values for 50 bursts when a low wanted signal is present. In this example, the wanted signal level is only 1 dB above the wanted signal level used in plot 1402, but the "4/3" ratio is 1.06. In plots 1901 and 2001 PSR values greater than 4.5 are recorded including values of 5. Therefore, in order to estimate if the result of an additive correlation for a burst is pure noise, a value of "4/3"=R may be used. For example, a value of R=0.4, about twice the theoretical value may be assumed. Other values for "4/3" may be chosen dependent upon the number of correlations, which may further depend upon the reception window duration 400, the sampling rate s, and the number of transmissions N in a burst.

With reference to FIGS. 18, 19 and 20 and the calculations based upon the cumulative probability, the PSR value and the "4/3" ratio may be used to make the following inferences about the received signals:

i) A PSR value of 5 may be assumed to indicate that a wanted signal is present, ii) A PSR value between 4.5 and 5 and a "4/3" ratio>R may indicate that a wanted signal is present, but if the "4/3" ratio<R it may indicate that a wanted signal is not present, iii) A PSR value between 3.5 and 4 and a "4/3" ratio>R may indicate that a wanted signal is present, but with low confidence, and if the "4/3" ratio<R it may be assumed to indicate that a wanted signal is not present, iv) A PSR value less than 3.5 may be assumed to indicate that a wanted signal is not present.

As an example, assume that the PSRs for the last 50 bursts are calculated, and the "4/3" ratio is measured. From i), if the PSR for the latest additive correlation window is 5 or over, that peak can be instantly assumed to be a wanted peak and an indication of a received wanted response packet 425 may be shown on the orbit 200. Also, the time associated with the peak may be outputted to the geo-location calculations. From ii), if the PSR from the latest additive correlation window is between 4.5 and 5, and the "4/3" ratio is >R, that peak can be assumed to be a wanted peak and an indication of a received wanted response packet 425 may be shown on the orbit 200 and the time associated with the peak is outputted to the geo-location calculations. However, if the "4/3" ratio is <R, then no indication is shown on the orbit 200 but the time associated with the peak is still outputted to the geo-location calculations.

From iii), if the PSR from the latest correlation window is between 3.5 and 4, and the "4/3" ratio is <R, then the peak is discarded as noise. If the "4/3" ratio is >R, then no indication is shown on the orbit 200 but the time associated with the peak is outputted to the geo-location calculations.

From iv), if the PSR from the latest additive correlation window is less than 3.5, then that peak is assumed to be due to noise and is discarded.

An elapsed time, say of 10 seconds, or a minimum of 50 bursts may be chosen in order to calculate the "4/3" ratio. A value of R=0.4 may be chosen for the "4/3" ratio as twice the theoretical ratio to allow for natural variations. Other values for the "4/3" ratio may be assumed, but this may affect the decision to display the reception on the orbit 200.

Figure 21:
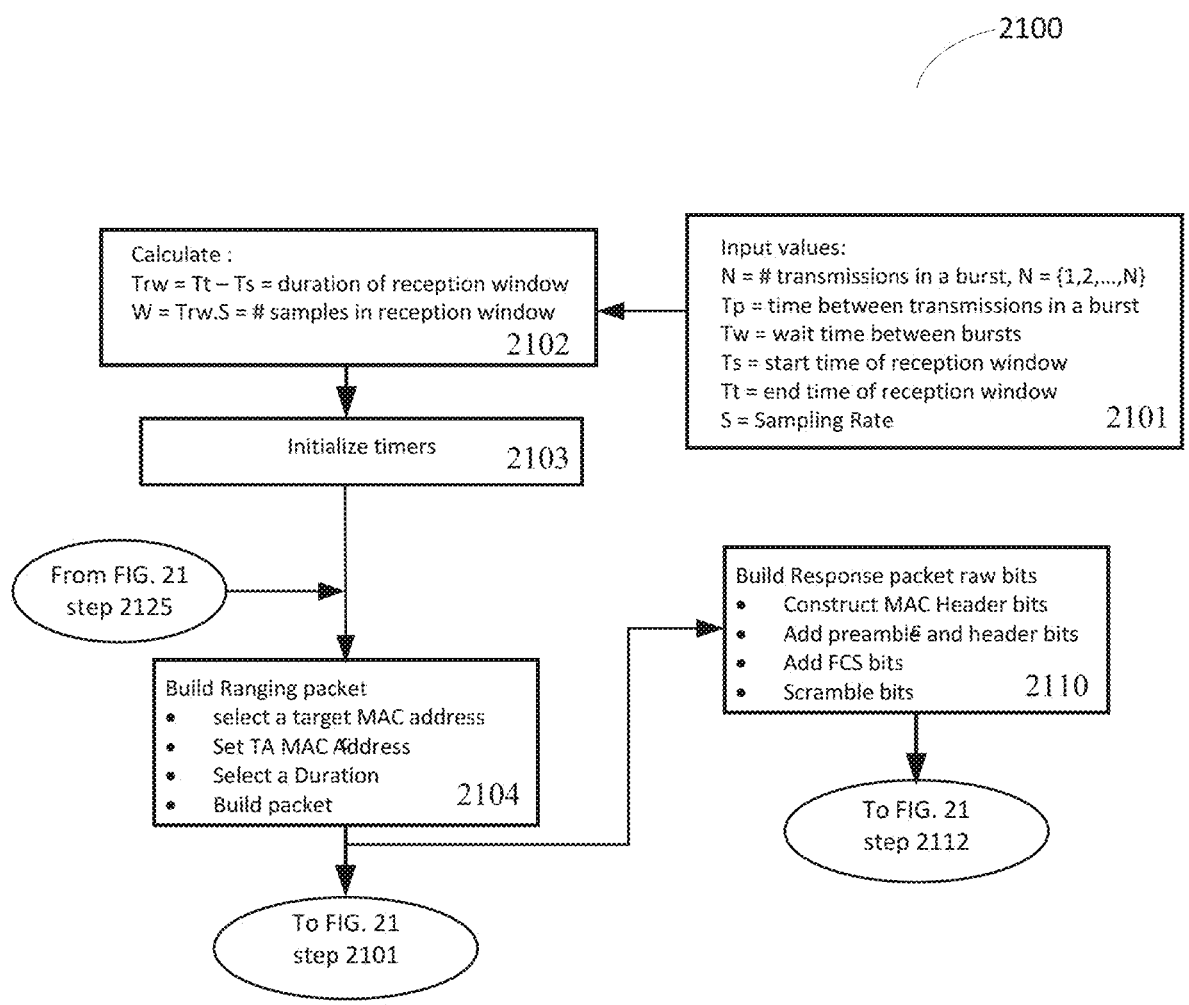
FIGS. 21 and 22 are a flow diagram of an example of one embodiment of the process.
Figure 22:
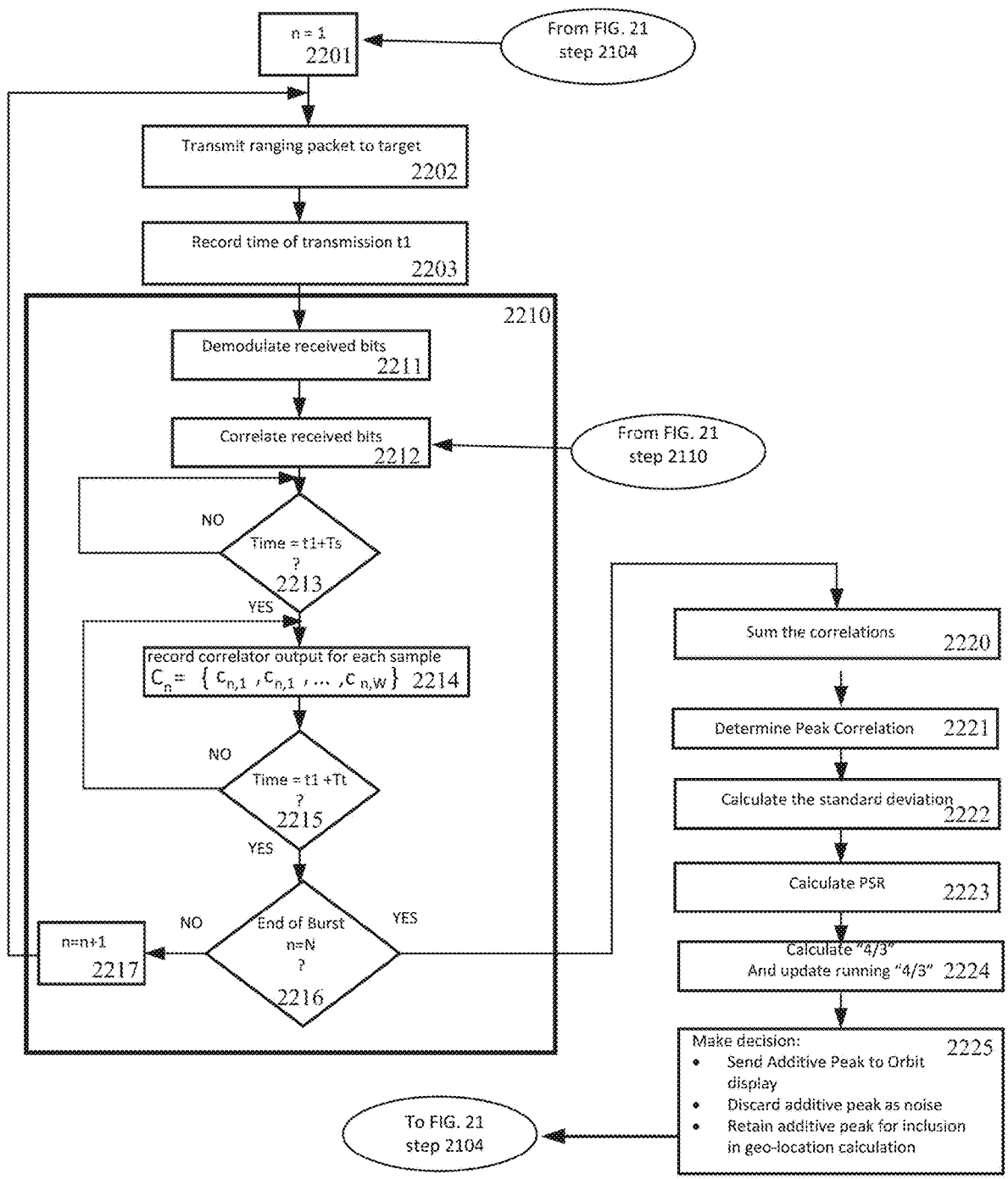

FIGS. 21 and 22 form a flow diagram 2100 of an example of one embodiment of the process that detects the likelihood of RTTs from a wanted target station 120 as compared with RTTs due to noise, such that an indication may be placed on a display of the orbit of an airborne measuring station 110, and such that selected RTTs can be forwarded for inclusion in the geo-location calculations, utilizing the example wireless communication device 900 which according to an embodiment of the disclosure may be used as or as part of the airborne measuring station 110. The process may start with step 2101 where a number of values are inputted. These values may be inputted to the processing circuitry 954 in the wireless receiver 950. In some embodiments, the values inputted may include:

N, the number of transmissions in a burst;
Tp, 430, the time between transmissions in a burst;
Tw, 571, the wait time between bursts;
Ts, 410, the start time of the reception window;
Tt, 420, the end time of the reception window; and
S, the sampling rate.
R, the "4/3" ratio At step 2102, certain values may be calculated. In some embodiments, the calculated values may include:

$Trw$, 400, the duration of the reception window,
$Trw = Tt - Ts$;

$W$, the number of samples in the reception window,
$W = Trw \cdot S$

These calculations may be performed by the processing circuitry 954 in the wireless receiver 950.

At step 2103, timers are initialized. At step 2104 the ranging packet 412 is built. The timers may be contained in, and Step 2104 may be performed by, the processing circuitry 920 in the wireless transmitter 910.

At step 2104, the ranging packet 412 is built. The MAC address of the target station 120 is selected, and the TA MAC address to be used in the ranging packet 412 is set; in the corresponding response packet 425, this MAC address will be the RA. A duration value is selected for the MAC header of the ranging packet 412; this effectively sets the value of the duration field expected in the response packet 425. The value of the duration field in the response packet 425 will be equal to the value of the duration field in the ranging packet 412 minus SIFS minus the length of the response packet 425. Hence, by setting a known specific value in the duration field a unique value for the duration field in the response packet 425 is set. The MAC header and payload for the ranging packet 412 is then constructed.

Step 2104 may be followed by step 2201 FIG. 22, where the value for a variable n is initialized. At step 2202 the ranging packet 412 may be transmitted. Step 2202 may include taking the MAC Header and payload constructed in step 2104, adding the preamble and header, scrambling, spreading and modulating the bits as performed by the RF transmitter 911 described in FIGS. 9 and 10. At step 2203, the time t1 of transmission of the ranging packet 412 is recorded. Step 2203 may be performed by wireless receiver 950 together with the time clock 960.

The values for the MAC address and the duration in step 2104 may be inputted to step 2110, where the expected raw bits for the response packet 425 are determined. This transfer of information may be between processing circuitry 920 and processing circuitry 954 across data bus 970. In step 2110, the MAC header for the response packet 425 is determined including the MAC address set in step 2104 as the RA, and duration field value based upon the duration field value set in step 2104 minus SIFS minus the length of the response packet. The length of a CTS or ACK packet at 1 Mbps is 304 µs, and SIFS is 10 µs, so the expected value for the duration field is a value Th 414 less than the duration set in step 2104. The determination of the MAC address and duration field may be performed by the processing circuitry 920. The preamble and header bits are added to the MAC header bits constructed in step 2104 and the FCS bits are calculated for the expected response packet 425. The complete response packet bits are then scrambled assuming the fixed seed specified for HR/DSSS in the Standard. The output from step 2110 is the scrambled bit stream 1135 representing the expected, scrambled, raw bit stream of the response packet 425.

At step 2210 it is determined if a response packet 425 has been received. Step 2210 may start with step 2211 where the incoming received signal is demodulated and de-spread resulting in the raw scrambled bit stream 1135, as described above with reference to FIG. 11. Step 2211 may be performed by the RF receiver 952. At step 2212, the raw scrambled bit stream 1135 may be correlated against the expected raw bit stream 1140 obtained from step 2110, as described above with respect to FIGS. 10 and 11. At step 2213, a check is made if the reception window has started. At time (t1+Ts) the reception window opens. The value of t1 is taken from step 2203 and the value for Ts 409 is inputted at step 2101. This check may be performed by the processing circuitry 954 in the wireless receiver 950. If the reception window has not opened, then the process waits at step 2213. If the time (t1+Tt) has elapsed, as determined at step 2213, then the process may proceed to step 2214 where the correlation values $C_n = \{c_{n,1}, c_{n,2}, \ldots, c_{n,W}\}$ for each sample are recorded. The value for W, the number of samples in the reception window, is calculated at step 2102. At step 2215, a check is made to determine if the reception window has closed. At time (t1+Tt) the reception window closes. The value of t1 is taken from step 2203 and the value for Tt 419 is inputted at step 2101. If the reception window has not closed, then the process continues at step 2214 to record the correlator values $C_n$.

When the reception window closes, as determined by step 2215, step 2215 may be followed by step 2216, where a check is made to determine if the burst of transmissions of request packets 414 has ended. If, in step 2216, it is determined that the burst has not ended, then at step 2217 the variable n is incremented and the process returns to step 2202, where another ranging packet 412 is transmitted. Several methods may be used to determine if the burst has ended. One method may include noting the value of the variable n and if n=N, then the burst has ended. To account for the possibility that a ranging packet 412 may have been missed, a check may be made of the elapsed time since the time, t1, of the received ranging packet 412 in step 2203. If this elapsed time is greater than, for example 3 Tp, then it may be assumed that the burst is complete. As the wait time Twait 571 between bursts is usually much greater than Tp 430, then choosing a multiple of Tp to determine if the burst is complete is straightforward. In addition, not receiving the transmitted ranging packet 412 should be a rare event. The determination whether the burst has ended may be performed by the processing circuitry 954 in the wireless receiver 950. If, at step 2216, it is determined that the burst is complete, then at step 2220 the individual correlations, $C_n$, for each reception window, for each of the n received bursts, are summed, as described above with reference to FIG. 12. The additive correlation, AC, is the sum of all the reception windows in a burst, $$AC = \{ac_1, ac_2, \ldots ac_W\}$$

Where, $$\text{For } i=1 \text{ to } W, ac_i = \Sigma_{n=1}^{N} C_n$$

Where W is the number of correlations in a reception window, and N is the number of packets in a burst.

Step 2220 may be performed by the processing circuitry 954 in the wireless receiver 950 or by the computer system 980. At step 2221, the peak of the additive correlation is determined, $AC_{max} = \text{Max}\{AC-\mu\}$, as described above with reference to FIG. 12. Step 2221 may be performed by the processing circuitry 954 in the wireless receiver 950 or by the processing circuitry 982 in the computer system 980.
At step 2222 where the standard deviation, σ, of the additive correlation is calculated, $$\text{Standard Deviation } \sigma = \sqrt{\frac{1}{W}\sum_{i=1}^{W}(ac_i - \mu)^2} \text{ Where}$$

$$\mu = \frac{1}{W}\sum_{i=1}^{W} ac_i$$

Step 2222 may be performed by the processing circuitry 954 in the wireless receiver 950 or by the processing circuitry 982 in the computer system 980.

At step 2223 the "Peak to Sigma Ratio", PSR, is determined.

$$PSR = \frac{AC_{max}}{\sigma}$$

Step 2223 may be performed by the processing circuitry 954 in the wireless receiver 950 or by the processing circuitry 982 in the computer system 980.

The value of "4/3" may be calculated, as described above with reference to FIGS. 18, 19, and 20, at step 2224. The value for "4/3" is calculated over a number of bursts. As the additive correlation scheme, described above with reference to FIGS. 12 to 16, returns a peak for every burst, the "4/3" ratio may alternatively be calculated over a set period of time, for example over 10 second periods. The result of the PSR calculation in step 2223 may be added to the results of the PSRs from the previous bursts and the "4/3" ratio updated in step 2234. Step 2224 may be performed by the processing circuitry 954 in the wireless receiver 950 or by the processing circuitry 982 in the computer system 980.

As discussed above with reference to FIGS. 18, 19, and 20, at step 2225, a decision may be made on whether to send the RTT that corresponds to the peak value, as determined in step 2221, for inclusion in the geo-location calculations and to send an indication to the display 986, whether to discard the peak as noise, or whether to not send the peak to the display 986 but still to send the peak for inclusion in the geo-location calculations. The PSR value calculated in step 2223 may be used together with the "4/3" ratio calculated in step 2234 and the "4/3" ratio R, set in step 2101, to make the decision as to how to use the peak value, as discussed above with reference to FIGS. 18, 19, and 20. Step 2225 may be performed by the processing circuitry 954 in the wireless receiver 950 or by the processing circuitry 982 in the computer system 980.

After having made the decision, in step 2225, on whether to use the peak determined in step 2221, the method may return to step 2104 where the next ranging packet 412 may be built.

The PSR and the "4/3" ratio, as described above with reference to FIGS. 18, 19, and 20 can be used to determine if the peak, as determined in step 2221, is probably due to noise or is a wanted peak corresponding to the response packet 425 for the target station 120.

Figure 23:
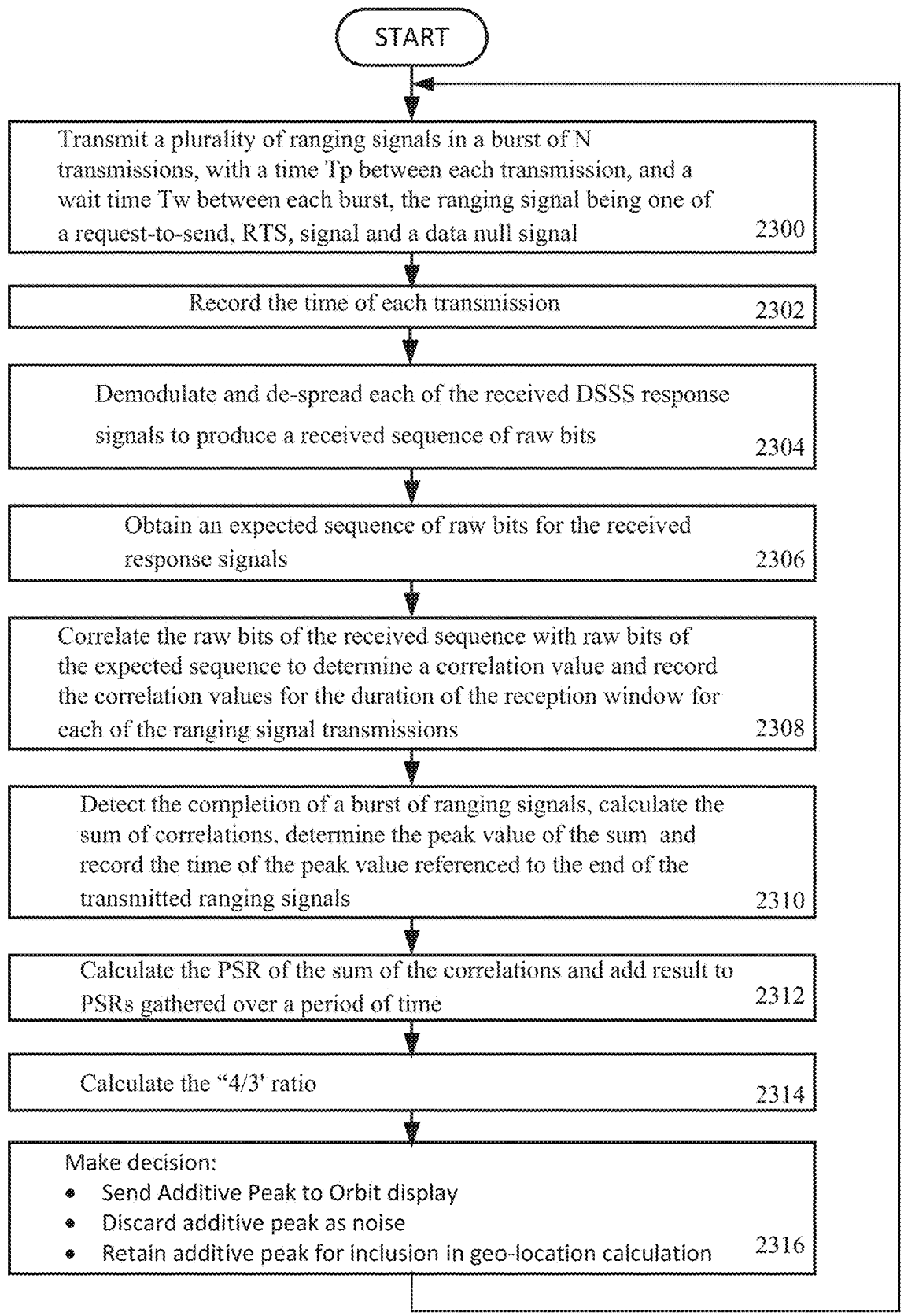
FIG. 23 is a flowchart of an example process that detects the likelihood of RTTs from a wanted target station as against RTTs due to noise.

FIG. 23 is a flowchart of an example process that detects the likelihood of RTTs from a wanted target station 120 as against RTTs due to noise such that an indication may be placed on a display of the orbit of an airborne measuring station 110, and such that selected RTTs can be forwarded for inclusion in the geo-location calculations. The process includes transmitting, via the RF transmitter 911, a plurality of ranging signals in a burst of N transmissions, with a time Tp between each transmission, and a wait time Tw between each burst (step 2300), and recording a time of each transmitted ranging signal (step 2302). The process further includes receiving, via the wireless receiver 950, demodulating, via DBPSK demodulator 1110 and de-spreading, via de-spreader 1120, the received DSSS response signal to produce a received sequence (step 2304). Also, an expected sequence of raw bits for the received response packet 425 is determined (step 2306). The raw bits of the received sequence are correlated, via the correlator 953, with the raw bits of the expected sequence to determine a correlation value indicative of an extent to which the received sequence matches the expected sequence and the correlation values are recorded for the duration Trw 400 of the reception window for each of the ranging signal transmissions (step 2308). The process further includes detecting the completion of a burst of ranging signals, calculating the sum of the correlation values, determining the peak value of the sum of the correlation values and recording the time of the peak value referenced to the end of the transmitted ranging signals (step 2310). The PSR of the sum of the correlations is then calculated and the result added to all the PSRs gathered over a preset time period (step 2312). The process further includes calculating the "4/3" ratio for all the PSRs over the preset time period (step 2314). Based upon the "4/3" ratio and the PSR of the peak determined in step 2310, a decision is made (step 2316) on whether to send the RTT that corresponds to the peak value for inclusion in the geo-location calculations and to send an indication to the display 986, whether to discard the peak as noise, or whether to not send the indication to the display 986 but still to send the RTT for inclusion in the geo-location calculations.

FIG. 24 is a flowchart of an example process for the geo-location of wireless local area network (WLAN) devices. The process may be performed by the wireless transmitter 911, wireless receiver 952 and processing circuitry 954. The process includes: for each of a plurality of transmission bursts (step 2400): transmitting, via the RF transmitter 911, a sequence of ranging signals (step 2402). The process also includes receiving, RF receiver 952, a plurality of ranging response signals from a second WD 900, the ranging response signals being responsive to the ranging signals (step 2402). For each of the plurality of ranging response signals, (step 2406) the method includes determining, via the processing circuitry 954, a received sequence of bits (step 2408) and determining a correlation between the received sequence of bits and an expected sequence of bits (step 2410). The process also includes for each of a plurality of transmitted ranging signal sequences, determining a first ratio of a peak value of a sum of the correlations to a standard deviation of the sum of correlations to obtain a peak to standard deviation ratio (PSR) (step 2412). The method also includes: determining a second ratio of a sum of PSRs having standard deviations in a first range of standard deviations to a sum of PSRs having standard deviations in a second range of standard deviations (step 2414); and determining a distance between the first WD 900 and the second WD 900 based at least in part on the second ratio (step 2416).

According to one aspect, a method in a first wireless device (WD) 900 includes: for each of a plurality of transmission bursts: transmitting a sequence of ranging signals and receiving a plurality of ranging response signals from a second WD 900, the ranging response signals being responsive to the ranging signals. For each of the plurality of ranging response signals, the method includes determining a received sequence of bits and determining a correlation between the received sequence of bits and an expected sequence of bits. The method also includes: for each of a plurality of transmitted ranging signal sequences, determining a first ratio of a peak value of the sum of the correlations to a standard deviation of the sum of the correlations to obtain a peak to standard deviation ratio (PSR): determining a second ratio of a sum of PSRs having standard deviations in a first range of standard deviations to a sum of PSRs having standard deviations in a second range of standard deviations; and determining a distance between the first WD 900 and the second WD 900 based at least in part on the second ratio.

According to this aspect, in some embodiments, the first range of standard deviations is 4σ to 4.5σ and the second range of standard deviations is 3.5σ to 4σ, σ being one standard deviation. In some embodiments, the method further includes: comparing the second ratio to a threshold; and when the second ratio is above the threshold and a PSR is within a specified range, then using a time of occurrence of the peak value to determine the distance between the first WD 900 and the second WD 900. In some embodiments, the method also includes: comparing the second ratio to a threshold; and when the second ratio is less than a threshold and a PSR is within a specified range, then not using a time of occurrence of the peak value to determine the distance between the first WD 900 and the second WD 900. In some embodiments, the method also includes, when a PSR is less than a threshold, then not using a time of occurrence of the peak value to determine the distance between the first WD 900 and the second WD 900. In some embodiments, the method further includes, based at least in part on the second ratio, performing one of: indicating that a signal has been received; using a time of occurrence of the peak value to determine the distance between the first WD 900 and the second WD 900; and discarding the time of occurrence of the peak value. In some embodiments, a time of occurrence of a peak value is used to determine the distance between the first WD 900 and the second WD 900 when a PSR is between 4.5 and 5 and the second ratio is greater than a threshold. In some embodiments, a time of occurrence of a peak value is not used to determine the distance between the first WD 900 and the second WD 900 when a PSR is between 3.5 and 4 and the second ratio is less than a threshold.

According to another aspect, a first wireless device (WD) 900 includes: a radio interface comprising an RF transmitter 911 and RF receiver 952 configured to, for each of a plurality of transmission bursts: transmit a sequence of ranging signals, and receive a plurality of ranging response signals from a second WD 900, each ranging response signal being responsive to a corresponding ranging signal. The WD 900 also includes processing circuitry 954 configured to: for each of the plurality of transmission bursts and for each of the plurality of ranging response signals: determine a received sequence of bits; and determine a correlation between the received sequence of bits and an expected sequence of bits. The processing circuitry 954 is also configured to, for each of a plurality of transmitted ranging signal sequences, determine a first ratio of a peak value of a sum of the correlations to a standard deviation of the sum of the correlations to obtain a peak to standard deviation ratio (PSR). The processing circuitry 954 is also configured to determine a second ratio of a sum of PSRs having standard deviations in a first range of standard deviations to a sum of PSRs having standard deviations in a second range of standard deviations; and determine a distance between the first WD 900 and the second WD 900 based at least in part on the second ratio.

According to this aspect, in some embodiments, the first range of standard deviations is 4σ to 4.5σ and the second range of standard deviations is 3.5σ to 4σ, σ being one standard deviation. In some embodiments, the processing circuitry 954 is further configured to: compare the second ratio to a threshold; and when the second ratio is above the threshold and a PSR is within a specified range, then use a time of occurrence of the peak value to determine the distance between the first WD 900 and the second WD 900. In some embodiments, the processing circuitry 954 is further configured to: compare the second ratio to a threshold; and when the second ratio is less than a threshold and a PSR is within a specified range, then not use a time of occurrence of the peak value to determine the distance between the first WD 900 and the second WD 900. In some embodiments, the processing circuitry 954 is further configured to, when a PSR is less than a threshold, then use a time of occurrence of the peak value to determine the distance between the first WD 900 and the second WD 900. In some embodiments, the processing circuitry 954 is further configured to, based at least in part on the second ratio, perform one of: indicate that a signal has been received; use a time of occurrence of the peak value to determine the distance between the first WD 900 and the second WD 900; and discard the time of occurrence of the peak value. In some embodiments, a time of occurrence of a peak value is used to determine the distance between the first WD 900 and the second WD 900 when a PSR is between 4.5 and 5 and the second ratio is greater than a threshold. In some embodiments, a time of occurrence of a peak value is not used to determine the distance between the first WD 900 and the second WD 900 when a PSR is between 3.5 and 4 and the second ratio is less than a threshold.

According to yet another aspect, a first wireless device (WD) 900, includes a radio interface including RF transmitter 911 and RF receiver 952 configured to, for each of a plurality of transmission bursts: transmit a plurality of ranging signals and record a time of transmission of each ranging signal of the plurality of ranging signals; and receive a plurality of ranging response signals, each ranging response signal corresponding to a respective ranging signal. The WD 900 also includes processing circuitry 954 in communication with the radio interface, the processing circuitry 954 configured to, for each of the plurality of transmission bursts: extract a sequence of bits from each ranging response signal of the plurality of ranging signals of a transmission burst to obtain a plurality of received bit sequences; correlate each received bit sequence of the plurality of received bit sequences with an expected sequence to produce a plurality of correlations. The processing circuitry 954 is furthered configured to, for each of a plurality of transmitted ranging signal sequences, determine a first ratio of a peak value of the sum of the correlations to a standard deviation of a sum of the correlations to obtain a peak to standard deviation ratio (PSR); determine a second ratio of a sum of PSRs having standard deviations in a first range of standard deviations to a sum of PSRs having standard deviations in a second range of standard deviations; and determine a distance between the first WD 900 and the second WD 900 based at least in part on the second ratio.

According to this aspect, in some embodiments, the first range of standard deviations is $4\sigma$ to $4.5\sigma$ and the second range of standard deviations is $3.5\sigma$ to $4\sigma$, $\sigma$ being one standard deviation. In some embodiments, the processing circuitry is further configured to: compare the second ratio to a threshold; and when the second ratio is above the threshold and a PSR is within a specified range, then use a time of occurrence of the peak value to determine the distance between the first WD and the second WD. In some embodiments, the processing circuitry is further configured to: compare the second ratio to a threshold; and when the second ratio is less than a threshold and a PSR is within a specified range, then not use a time of occurrence of the peak value to determine the distance between the first WD and the second WD. In some embodiments, the processing circuitry is further configured to, when a PSR is less than a threshold, then use a time of occurrence of the peak value to determine the distance between the first WD and the second WD. In some embodiments, the processing circuitry is further configured to, based at least in part on the second ratio, perform one of: indicate that a signal has been received; use a time of occurrence of the peak value to determine the distance between the first WD and the second WD; and discard the time of occurrence of the peak value. In some embodiments, a time of occurrence of a peak value is used to determine the distance between the first WD 900 and the second WD 900 when a PSR is between 4.5 and 5 and the second ratio is greater than a threshold. In some embodiments, a time of occurrence of a peak value is not used to determine the distance between the first WD 900 and the second WD 900 when a PSR is between 3.5 and 4 and the second ratio is less than a threshold.

Some embodiments include the following:

Embodiment 1—A method in a first wireless device (WD), the method comprising:

transmitting a plurality of ranging signals;

recording times of transmission for each of the ranging signals;

setting a duration and start and end times of a reception window that starts at time Ts after the transmission of each ranging signal and ends at time Tt after the transmission of each ranging signal;

receiving direct sequence spread spectrum (DSSS) response signals transmitted from a second WD, each DSSS response signal being in response to one of the plurality of ranging signals;

demodulating and de-spreading each of the received DSSS response signals to produce a received sequence of bits;

determining an expected sequence of bits for the received response signals;

correlating the received sequence of bits with the expected sequence of bits to determine a correlation value, the correlation value being indicative of an extent to which the received sequence matches the expected sequence;

determining a plurality of correlation values $C_n$, for a duration of a reception window, n, for each of the plurality of ranging signal transmissions, $C_n = \{c_{n,1}, c_{n,2}, \ldots c_{n,W}\}$ where W is the number of samples in the reception window;

calculating a sum of the correlation values;

calculating the standard deviation $\sigma$ of the sum of the correlation values;

determining a peak value, $AC_{max}$ of the sum of the correlation values;

determining a time of the peak value referenced to an end of the plurality of ranging signal transmissions;

determining a Peak to Sigma Ratio value, PSR, $$PSR = \frac{AC_{max}}{\sigma};$$

determining a ratio for the PSRs over a period of time; and making a decision, based upon the PSR and the ratio to either:

indicate on the display of the first WD that a signal has been received, and to output the time of the peak value to be used in the geo-location calculations; or, output the time of the peak value to be used in the geo-location calculations; or, discard the time of the peak value.

Embodiment 2. The method of Embodiment 1, wherein the ratio for the PSRs is a "4/3" ratio for the PSRs over a period of time, where:

"4/3"=Sum PSRs between $4\sigma$ and $4.5\sigma$/Sum PSRs between $3.5\sigma$ and $4\sigma$.

Embodiment 3. The method of Embodiment 1, wherein the method further comprises;

transmitting a plurality of ranging signals in a burst of N transmissions, with a time Tp between each transmission, and with a wait time Tw between each burst;

detecting a completion of a burst of ranging signals;

calculating a sum AC of the correlation values AC=$\{ac_1, ac_2, \ldots ac_W\}$, where W is the number of correlations in a reception window, for i=1 to W, $ac_i = \Sigma_{n=1}^{N} c_n$ and N is the number of packets in a burst;

Embodiment 4. The method of Embodiment 1, wherein the method further comprises;

calculating the average $\mu$ of the sum of the correlation values, $$\mu = \frac{1}{W} \sum_{i=1}^{W} ac_i;$$

calculating the standard deviation a of the sum of the correlation values, $$\sigma = \sqrt{\frac{1}{W}\sum_{i=1}^{W}(ac_i - \mu)^2}\ ;$$

determining a peak value, $AC_{max}$ of the sum of the correlation values, $AC_{max}=\text{Max}\{AC-\mu\}$;

Embodiment 5 The method of Embodiment 1, further comprising determining parameters of the plurality of ranging signals by one of selecting a WD receiver address (RA) to be used as a medium access control (MAC) address of the second WD, selecting a MAC address to be used as a wireless transmitter address (TA) and selecting a duration value for the duration of the reception window.

Embodiment 6. The method of Embodiment 1, wherein the "4/3" ratio is measured over time periods in which at least 50 bursts have occurred.

Embodiment 7. The method of Embodiment 1, wherein an indication is sent to the WD display and the time of the peak being outputted for inclusion in the geo-location calculations for the following conditions:
  a PSR value of 5
  a PSR value of between 4.5 and 5 and a "4/3" ratio>R, where R is a preset value.

Embodiment 8. The method of Embodiment 1, wherein the time of the peak being outputted for inclusion in the geo-location calculations for the following conditions:
  a PSR value of between 4.5 and 5 and a "4/3" ratio>R
  a PSR value of between 3.5 and 4 and a "4/3" ratio>R Embodiment 9. The method of Embodiment 1, wherein the time of the peak being discarded for the following conditions:
  a PSR value of between 3.5 and 4 and "4/3" ratio<R
  a PSR value less than 3.5.

Embodiment 10. A first wireless device (WD), comprising:
  a transmitter configured to transmit a plurality of ranging signals;
  processing circuitry in communication with the transmitter, the processing circuitry configured to:
    record times of transmission for each of the ranging signals;
    set a duration and start and end times of a reception window that starts at time Ts after the transmission of each ranging signal and ends at time Tt after the transmission of each ranging signal;
    receive direct sequence spread spectrum (DSSS) response signals transmitted from a second WD, each DSSS response signal being in response to one of the plurality of ranging signals;
    demodulate and de-spread each of the received DSSS response signals to produce a received sequence of bits;
    determine an expected sequence of bits for the received response signals;
    correlate the received sequence of bits with the expected sequence of bits to determine a correlation value, the correlation value being indicative of an extent to which the received sequence matches the expected sequence;
    determine a plurality of correlation values $C_n$, for a duration of a reception window, n, for each of the plurality of ranging signal transmissions, $C_n=\{c_{n,1}, c_{n,2}, \ldots c_{n,W}\}$ where W is the number of samples in the reception window;
    calculate a sum of the correlation values;
    calculate the standard deviation $\sigma$ of the sum of the correlation values;
    determine a peak value, $AC_{max}$ of the sum of the correlation values;
    determine a time of the peak value referenced to an end of the plurality of ranging signal transmissions;
    determine a ratio for the PSRs over a period of time; and
    making a decision, based upon the PSR and the ratio to either:
      indicate on the display of the first WD that a signal has been received, and to output the
      time of the peak value to be used in the geo-location calculations; or,
      output the time of the peak value to be used in the geo-location calculations; or,
      discard the time of the peak value.

Embodiment 11. The first WD of Embodiment 1, wherein the ratio for the PSRs is a "4/3" ratio for the PSRs over a period of time, where:
  "4/3"=Sum PSRs between $4\sigma$ and $4.5\sigma$/Sum PSRs between $3.5\sigma$ and $4\sigma$.

Embodiment 12. The first WD of Embodiment 10, wherein the transmitter is further configured to:
  transmit a plurality of ranging signals in a burst of N transmissions, with a time Tp between each transmission, and with a wait time Tw between each burst;
  the processing circuitry is further configured to:
  detect a completion of a burst of ranging signals; and
  calculate a sum AC of the correlation values $AC=\{ac_1, ac_2, \ldots ac_W\}$, where W is the number of correlations in a reception window, for i=1 to W, $ac_i=\Sigma_{n=1}^{N}c_n$ and N is the number of packets in a burst;

Embodiment 13. The first WD of Embodiment 10, wherein the processing circuitry is further configured to:
  calculate the average $\mu$ of the sum of the correlation values, $$\mu = \frac{1}{W}\sum_{i=1}^{W} ac_i;$$

calculate the standard deviation $\sigma$ of the sum of the correlation values, $$\sigma = \sqrt{\frac{1}{W}\sum_{i=1}^{W}(ac_i - \mu)^2}\ ;$$

determine a peak value, $AC_{max}$ of the sum of the correlation values, $AC_{max}=\text{Max}\{AC-\mu\}$;

Embodiment 14. The first WD of Embodiment 9, wherein the processing circuitry is further configured to determine parameters of the plurality of ranging signals by one of selecting a WD receiver address (RA) to be used as a medium access control (MAC) address of the second WD, selecting a MAC address to be used as a wireless transmitter address (TA) and selecting a duration value for the duration of the reception window.

Embodiment 15. The first WD of Embodiment 10, wherein the "4/3" ratio is measured over time periods in which at least 50 bursts have occurred.

Embodiment 16. The first WD of Embodiment 10, wherein an indication is sent to the WD display and the time of the peak being outputted for inclusion in the geo-location calculations for the following conditions:

a PSR value of 5 a PSR value of between 4.5 and 5 and a "4/3" ratio>R, where R is a preset value.

Embodiment 17. The first WD of Embodiment 10, wherein the time of the peak being outputted for inclusion in the geo-location calculations for the following conditions:

a PSR value of between 4.5 and 5 and a "4/3" ratio>R a PSR value of between 3.5 and 4 and a "4/3" ratio>R Embodiment 18. The first WD of Embodiment 10, wherein the time of the peak being discarded for the following conditions:

a PSR value of between 3.5 and 4 and "4/3" ratio<R a PSR value less than 3.5.

Embodiment 19. An airborne station, comprising:

a transmitter configured to:

transmit a plurality of ranging signals, a ranging signal being one of a request-to-send, RTS, signal and a data null signal;

record the time of each transmission, and a receiver configured to:

receive a direct sequence spread spectrum, DSSS, response signal from a ground station, the DSSS response signal being spread by an 11 bit barker code, each DSSS response signal responsive to a different one of the plurality of ranging signals;

processing circuitry in communication with the transmitter and receiver, the processing circuitry configured to:

demodulate and de-spread each of the received DSSS response signals to produce a received sequence of bits;

determine an expected sequence of bits for the received response signals;

correlate the received sequence of bits with the expected sequence of bits to determine a correlation value, the correlation value being indicative of an extent to which the received sequence matches the expected sequence;

determine a plurality of correlation values $C_n$, for a duration of a reception window, n, for each of the plurality of ranging signal transmissions, $C_n=\{c_{n,1}, c_{n,2}, \ldots c_{n,W}\}$ where W is the number of samples in the reception window;

determine a sum of the correlation values;

calculate the standard deviation $\sigma$ of the sum of the correlation values;

determine a peak value, $AC_{max}$ of the sum of the correlation values;

determine a time of the peak value referenced to an end of the plurality of ranging signal transmissions;

determine a Peak to Sigma Ratio value, PSR, $$PSR = \frac{AC_{max}}{\sigma};$$

determine a "4/3" ratio for the PSRs over a period of time, where

"4/3"=Sum PSRs between 4σ and 4.5σ/Sum PSRs between 3.5σ and 4σ;

make a decision, based upon the PSR and the "4/3" ratio, to, either:

indicate on the display of the first WD that a signal has been received, and to output the time of the peak value to be used in the geo-location calculations; or, output the time of the peak value to be used in the geo-location calculations; or, discard the time of the peak value.

Embodiment 20. The first WD of Embodiment 10, wherein the transmitter is further configured to:

transmit a plurality of ranging signals in a burst of N transmissions, with a time Tp between each transmission, and with a wait time Tw between each burst;

the processing circuitry is further configured to:

detect a completion of a burst of ranging signals; and calculate a sum AC of the correlation values $AC=\{ac_1, ac_2, \ldots ac_W\}$, where W is the number of correlations in a reception window, for i=1 to W, $ac_i=\Sigma_{n=1}^{N}c_n$ and N is the number of packets in a burst;

Embodiment 21. The airborne station of Embodiment 10, wherein the transmitter is further configured to:

transmit a plurality of ranging signals in a burst of N transmissions, with a time Tp between each transmission, and with a wait time Tw between each burst;

the processing circuitry is further configured to:

detect a completion of a burst of ranging signals;

calculate a sum AC of the correlation values $AC=\{ac_1, ac_2, \ldots ac_W\}$, where W is the number of correlations in a reception window, for i=1 to W, $ac_i=\Sigma_{n=1}^{N}c_n$ and N is the number of packets in a burst;

calculate the average μ of the sum of the correlation values, $$\mu = \frac{1}{W}\sum_{i=1}^{W} ac_i;$$

calculate the standard deviation a of the sum of the correlation values, $$\sigma = \sqrt{\frac{1}{W}\sum_{i=1}^{W}(ac_i - \mu)^2};$$

and determine a peak value, $AC_{max}$ of the sum of the correlation values, $AC_{max}$=Max {AC-μ}.

As will be appreciated by one of skill in the art, the concepts described herein may be embodied as a method, data processing system, and/or computer program product. Accordingly, the concepts described herein may take the form of an entirely hardware embodiment, an entirely software embodiment, or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems, and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the start and end times of the reception window, the time allowance for the maximum jitter of the turnaround time (SIFS) of a response signal, the duration field value(s), the MAC address used in the ranging packet, the details of the de-spreader and de-modulator, the values used with the "4/3" ratio, variations on the PSR calculations, the time period used with the "4/3" evaluation, the decisions to show the indication on the orbit display and the decisions to use the RTT in the geo-location calculations. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD), the method comprising:
   transmitting a sequence of ranging signals in a burst of N transmissions; and
   receiving a plurality of ranging response signals from a second WD, the ranging response signals being responsive to the ranging signals; and
   for each of the plurality of ranging response signals:
      determining a received sequence of bits; and
      determining a correlation between the received sequence of bits and an expected sequence of bits; and
   for each of a plurality of transmitted ranging signal sequences, determining a first ratio of a peak value of a sum of the correlations to a standard deviation of the sum of correlations to obtain a peak to standard deviation ratio (PSR); and
   determining a second ratio of a sum of PSRs having standard deviations in a first range of standard deviations to a sum of PSRs having standard deviations in a second range of standard deviations; and
   determining a distance between the first WD and the second WD based at least in part on the second ratio.

2. The method of claim 1, wherein the first range of standard deviations is 4σ to 4.5σ and the second range of standard deviations is 3.5σ to 4σ, σ being one standard deviation.

3. The method of claim 1, further comprising:
   comparing the second ratio to a threshold; and
   when the second ratio is above the threshold and a PSR is within a specified range, then using a time of occurrence of the peak value to determine the distance between the first WD and the second WD.

4. The method of claim 1, further comprising:
   comparing the second ratio to a threshold; and
   when the second ratio is less than a threshold and a PSR is within a specified range, then not using a time of occurrence of the peak value to determine the distance between the first WD and the second WD.

5. The method of claim 1, further comprising, when a PSR is less than a threshold, then not using a time of occurrence of the peak value to determine the distance between the first WD and the second WD.

6. The method of claim 1, further comprising, based at least in part on the second ratio, performing one of:
   indicating that a signal has been received;
   using a time of occurrence of the peak value to determine the distance between the first WD and the second WD; and
   discarding the time of occurrence of the peak value.

7. A first wireless device (WD) comprising:
   a radio interface configured to:
      transmit a sequence of ranging signals in a burst of N transmissions; and
      receive a plurality of ranging response signals from a second WD, the ranging response signals being responsive to the ranging signals; and
   processing circuitry configured to:
      for each of the plurality of ranging response signals:
         determine a received sequence of bits; and determine a correlation between the received sequence of bits and an expected sequence of bits; and for each of a plurality of transmitted ranging signal sequences, determine a first ratio of a peak of a sum of correlations to a standard deviation of the sum of correlations to obtain a peak to standard deviation ratio (PSR);

determine a second ratio of a sum of PSRs having standard deviations in a first range of standard deviations to a second sum of PSRs having standard deviations in a second range of standard deviation; and determine a distance between the first WD and the second WD based at least in part on the second ratio.

8. The first WD of claim 7, wherein the first range of standard deviations is 4σ to 4.5σ and the second range of standard deviations is 3.5σ to 4σ, σ being one standard deviation.

9. The first WD of claim 7, wherein the processing circuitry is further configured to:
compare the second ratio to a threshold; and
when the second ratio is above the threshold and a PSR is within a specified range, then use a time of occurrence of the peak value to determine the distance between the first WD and the second WD.

10. The first WD of claim 7, wherein the processing circuitry is further configured to:
compare the second ratio to a threshold; and
when the second ratio is less than a threshold and a PSR is within a specified range, then not use a time of occurrence of the peak value to determine the distance between the first WD and the second WD.

11. The first WD of claim 7, wherein the processing circuitry is further configured to, when a PSR is less than a threshold, then use a time of occurrence of the peak value to determine the distance between the first WD and the second WD.

12. The first WD of claim 7, wherein the processing circuitry is further configured to, based at least in part on the second ratio, perform one of:
indicate that a signal has been received;
use a time of occurrence of the peak value to determine the distance between the first WD and the second WD; and
discard the time of occurrence of the peak value.

13. A first wireless device (WD), comprising:
a radio interface configured to:
transmit a plurality of ranging signals and recording a time of transmission of each ranging signal of the plurality of ranging signals; and
receive a plurality of ranging response signals from a second WD; and
processing circuitry in communication with the radio interface, the processing circuitry configured to:
extract a sequence of bits from each ranging response signal of the plurality of ranging signals to obtain a plurality of received bit sequences;
correlate each received bit sequence of the plurality of received bit sequences with an expected sequence to produce a plurality of correlations;
for each of a plurality of transmitted ranging signal sequences, determining a first ratio of a peak value of a sum of the correlations to a standard deviation of the sum of correlations to obtain a peak to standard deviation ratio (PSR);
determine a second ratio of a sum of PSRs having standard deviations in a first range of standard deviations to a sum of PSRs having standard deviations in a second range of standard deviations; and
determine a distance between the first WD and the second WD based at least in part on the second ratio.

14. The first WD of claim 13, wherein the first range of standard deviations is 4σ to 4.5σ and the second range of standard deviations is 3.5σ to 4σ, σ being one standard deviation.

15. The first WD of claim 13, wherein the processing circuitry is further configured to:
compare the second ratio to a threshold; and
when the second ratio is above the threshold and a PSR is within a specified range, then use a time of occurrence of the peak value to determine the distance between the first WD and the second WD.

16. The first WD of claim 13, wherein the processing circuitry is further configured to:
compare the second ratio to a threshold; and
when the second ratio is less than a threshold and a PSR is within a specified range, then not use a time of occurrence of the peak value to determine the distance between the first WD and the second WD.

17. The first WD of claim 13, wherein the processing circuitry is further configured to, when a PSR is less than a threshold, then use a time of occurrence of the peak value to determine the distance between the first WD and the second WD.

18. The first WD of claim 13, wherein the processing circuitry is further configured to, based at least in part on the second ratio, perform one of:
indicate that a signal has been received;
use a time of occurrence of the peak value to determine the distance between the first WD and the second WD; and
discard the time of occurrence of the peak value.

19. The first WD of claim 13, wherein a time of occurrence of a peak value is used to determine the distance between the first WD and the second WD when a PSR is between 4.5 and 5 and the second ratio is greater than a threshold.

20. The first WD of claim 13, wherein a time of occurrence of a peak value is not used to determine the distance between the first WD and the second WD when a PSR is between 3.5 and 4 and the second ratio is less than a threshold.

* * * * *